United States Patent
Fujioka

(10) Patent No.: US 8,379,254 B2
(45) Date of Patent: Feb. 19, 2013

(54) IMAGE COMMUNICATION APPARATUS, IMAGE COMMUNICATION METHOD, AND COMPUTER PROGRAM PRODUCT

(75) Inventor: Susumu Fujioka, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 814 days.

(21) Appl. No.: 12/461,286

(22) Filed: Aug. 6, 2009

(65) Prior Publication Data

US 2010/0033756 A1 Feb. 11, 2010

(30) Foreign Application Priority Data

Aug. 8, 2008 (JP) .................................. 2008-206305
Jun. 1, 2009 (JP) .................................. 2009-131912

(51) Int. Cl.
*G06F 3/12* (2006.01)
*H04N 1/60* (2006.01)

(52) U.S. Cl. ........................ 358/1.15; 358/1.9; 358/1.11

(58) Field of Classification Search ........................ None
See application file for complete search history.

(56) References Cited

U.S. PATENT DOCUMENTS 4,630,129 A * 12/1986 Hayashi et al. ............... 358/296
2010/0195123 A1* 8/2010 Fujioka ........................ 358/1.9

FOREIGN PATENT DOCUMENTS

| JP | 05304576 A | * 11/1993 |
| JP | 2000-151957 | 5/2000 |
| JP | 2000-174973 | 6/2000 |
| JP | 2005-321567 | 11/2005 |
| JP | 2006-262024 | 9/2006 |

* cited by examiner

*Primary Examiner* — Dov Popovici
(74) *Attorney, Agent, or Firm* — Harness, Dickey & Pierce, P.L.C.

(57) ABSTRACT

An image-data receiving unit receives image data from other image communication apparatus. A storing unit stores therein the image data. An output unit outputs the image data stored in the storing unit. A reading unit reads the image data output by the output unit. An extracting unit extracts a difference between the image data read by the reading unit and the image data stored in the storing unit. A determining unit determines whether the difference extracted by the extracting unit satisfies a predetermined condition. A control unit controls a transmission of a message to other image communication apparatus based on a result of determination by the determining unit.

17 Claims, 18 Drawing Sheets

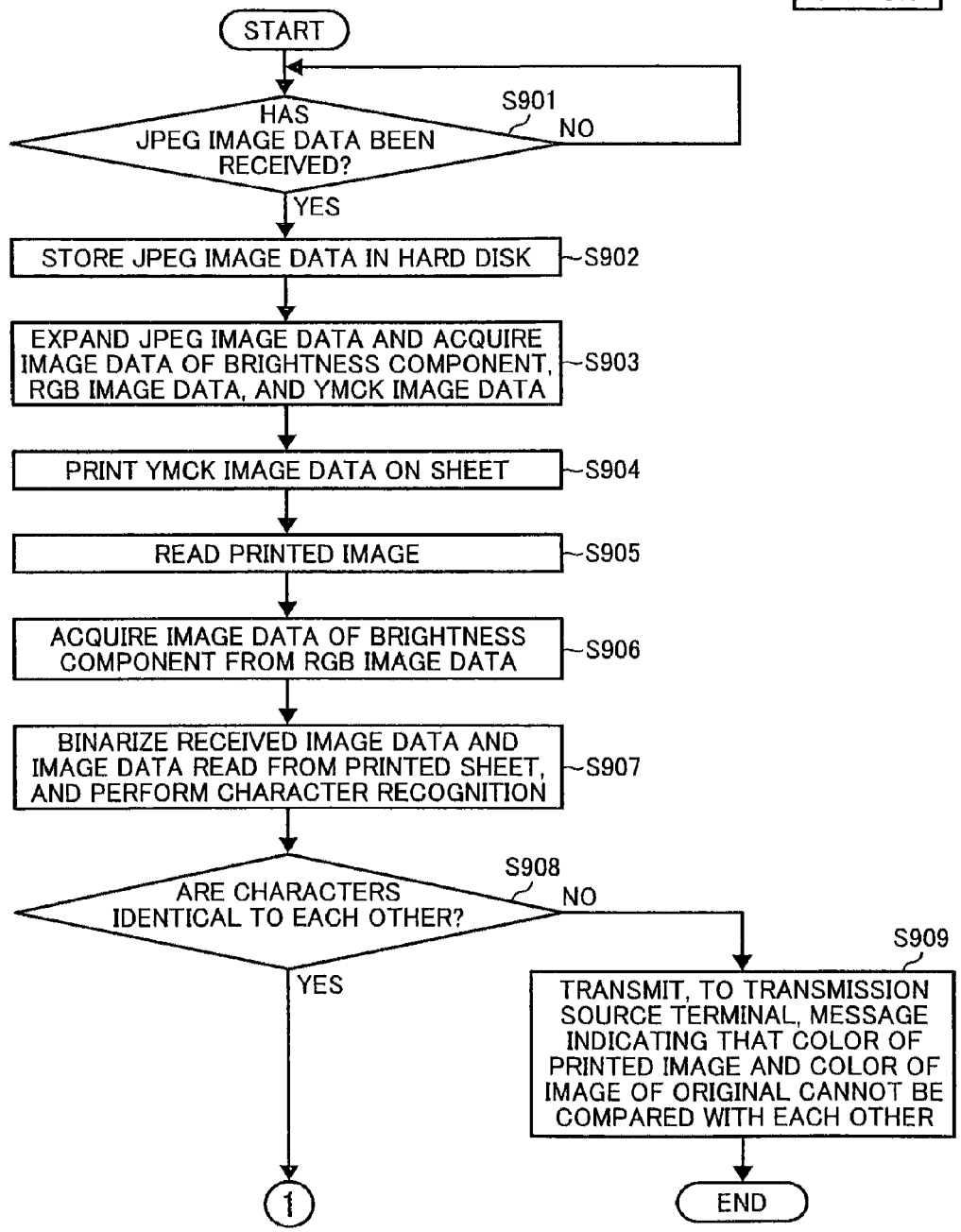

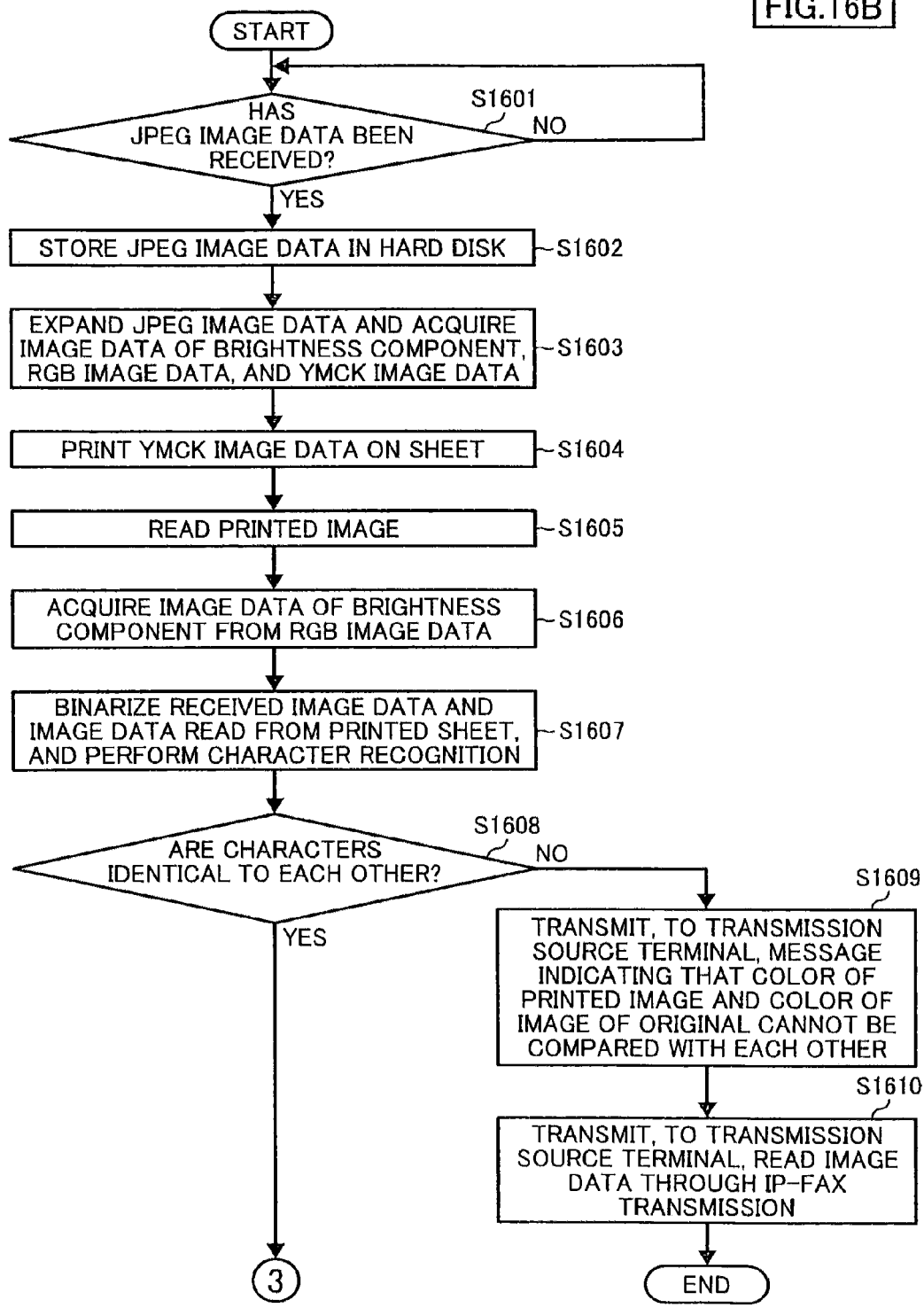

FIG. 21

The Quality of Products:
1: XXXXXXXXXXX
2: XXXXXXXX
3: XXXXXXXXXXXXX
4: XXXXXXXXXX

FIG. 22

| CHARACTER | FIRST CLASS | SECOND CLASS | THIRD CLASS |
|---|---|---|---|
| A | △, ··· | 4, ··· | 山, 日, ··· |
| B | P, R, 8, ··· | D, E, ··· | F, 日, 日, ··· |
| C | G, O, 0, ··· | D, Q, ··· | 6, ··· |
| ⋮ | | | |
| 日 | E, 日, ··· | B, F, 田, ··· | A, 8, 旦, ··· |
| 日 | E, 日, ··· | B, F, 田, ··· | A, 8, 旦, ··· |
| ⋮ | | | |

IMAGE COMMUNICATION APPARATUS, IMAGE COMMUNICATION METHOD, AND COMPUTER PROGRAM PRODUCT

CROSS-REFERENCE TO RELATED APPLICATIONS

The present application claims priority to and incorporates by reference the entire contents of Japanese priority document No. 2008-206305 filed in Japan on Aug. 8, 2008 and Japanese priority document No. 2009-131912 filed in Japan on Jun. 1, 2009.

BACKGROUND OF THE INVENTION

1. Field of the Invention

The present invention relates to a technology for notifying a printing result of image data received through a network communication.

2. Description of the Related Art

An image communication apparatus, such as a facsimile (FAX) machine, is provided with an acknowledge function that enables a sender of image data to check, when the sender transmits the image data from a transmitting-side image communication apparatus (hereinafter, "transmitting apparatus") to a receiving-side image communication apparatus (hereinafter, "receiving apparatus"), whether the transmitted image data has normally reached the receiving apparatus. With use of the acknowledge function, acknowledge information containing information about whether the image data transmitted from the transmitting apparatus has normally reached the receiving apparatus or transmission has been interrupted while the receiving apparatus has been receiving the image data can be sent from the receiving apparatus to the transmitting apparatus (see, for example, Japanese Patent Application Laid-open No. 2000-151957 and Japanese Patent Application Laid-open No. 2000-174973).

As described above, the conventional image communication apparatus enables the sender of the image data to check whether the image data has normally reached the receiving apparatus. However, the acknowledge function installed in the conventional image communication apparatus is capable of notifying the transmitting apparatus of only information about whether the receiving apparatus has normally received the image data. Therefore, with the conventional communication apparatus, the sender of the image data cannot check the quality of an image of the image data printed by the receiving apparatus.

SUMMARY OF THE INVENTION

It is an object of the present invention to at least partially solve the problems in the conventional technology.

According to one aspect of the present invention, there is provided an image communication apparatus including an image-data receiving unit that receives image data from other image communication apparatus; a storing unit that stores therein the image data; an output unit that outputs the image data stored in the storing unit; a reading unit that reads the image data output by the output unit; a difference extracting unit that extracts a difference between the image data read by the reading unit and the image data stored in the storing unit; a difference determining unit that determines whether the difference extracted by the difference extracting unit satisfies a predetermined condition; and a control unit that controls a transmission of a message to the other image communication apparatus based on a result of determination by the difference determining unit.

Furthermore, according to another aspect of the present invention, there is provided a method of communicating image data between a first image communication apparatus and a second image communication apparatus. The method includes transmitting including the first image communication apparatus transmitting image data to the second image communication apparatus; receiving including the second image communication apparatus receiving the image data from the first image communication apparatus; storing including the second image communication apparatus storing the image data received at the receiving; outputting including the second image communication apparatus outputting the image data stored at the storing; reading including the second image communication apparatus reading the image data output at the outputting; extracting including the second image communication apparatus extracting a color difference between the image data read at the reading and the image data stored at the storing; determining including the second image communication apparatus determining whether the color difference extracted at the extracting satisfies a predetermined condition; and controlling including the second image communication apparatus controlling, when it is determined that the color difference does not satisfy the predetermined condition at the determining, a transmission of a message indicating that the image data output at the outputting is different from the image data received at the receiving to the first image communication apparatus.

Moreover, according to still another aspect of the present invention, there is provided a computer program product including a computer usable medium having computer readable program codes embodied in the medium for implementing a method of communicating image data between a first image communication apparatus and a second image communication apparatus. The program codes when executed cause a computer to execute transmitting including the first image communication apparatus transmitting image data to the second image communication apparatus; receiving including the second image communication apparatus receiving the image data from the first image communication apparatus; storing including the second image communication apparatus storing the image data received at the receiving; outputting including the second image communication apparatus outputting the image data stored at the storing; reading including the second image communication apparatus reading the image data output at the outputting; extracting including the second image communication apparatus extracting a color difference between the image data read at the reading and the image data stored at the storing; determining including the second image communication apparatus determining whether the color difference extracted at the extracting satisfies a predetermined condition; and controlling including the second image communication apparatus controlling, when it is determined that the color difference does not satisfy the predetermined condition at the determining, a transmission of a message indicating that the image data output at the outputting is different from the image data received at the receiving to the first image communication apparatus.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 21 is a schematic diagram of an example of different characters identified as a result of comparison of characters according to the fourth embodiment; and FIG. 22 is an example of information stored in a character extracting unit of the MFP functioning as a receiving apparatus according to the fourth embodiment.

DETAILED DESCRIPTION OF THE PREFERRED EMBODIMENTS

Exemplary embodiments of the present invention are explained in detail below with reference to the accompanying drawings. In the description of the following embodiments and the drawings, components having the practically same functions are assigned with the same reference symbols, and the same explanation is not repeated.

In the following embodiments, a multifunction peripheral (MFP) having functions of a printer, a copier, a facsimile (FAX) machine, a scanner, and the like in one package is described as an example of an image communication apparatus. However, the present invention can be applied to other image communication apparatuses having image communication functions. Furthermore, in the following embodiments, an internet protocol (IP)-FAX function that enables communication between apparatuses by using a session initiation protocol (SIP) server is described as an example of an image communication function of the image communication apparatus. However, the image communication function is not limited to this example.

Figure 1:
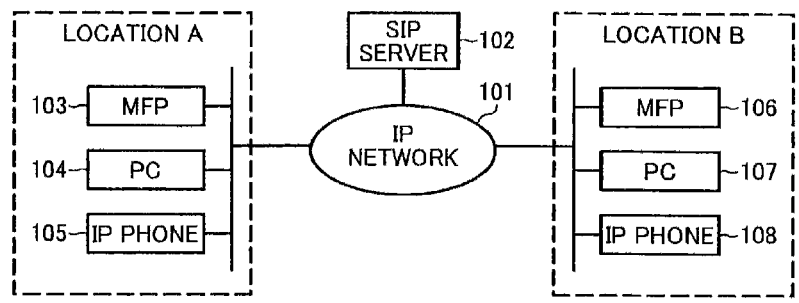
FIG. 1 is a schematic diagram of an operational configuration of a multifunction peripheral (MFP) according to a first embodiment of the present invention.

FIG. 1 is a schematic diagram of an operational configuration of an MFP 103 and an MFP 106 according to a first embodiment of the present invention. An SIP server 102 is connected to an IP network 101. The MFP 103, a personal computer (PC) 104, and an IP phone 105 at a location A and the MFP 106, a PC 107, and an IP phone 108 at a location B are allowed to communicate with one another via the IP network 101.

Figure 2:
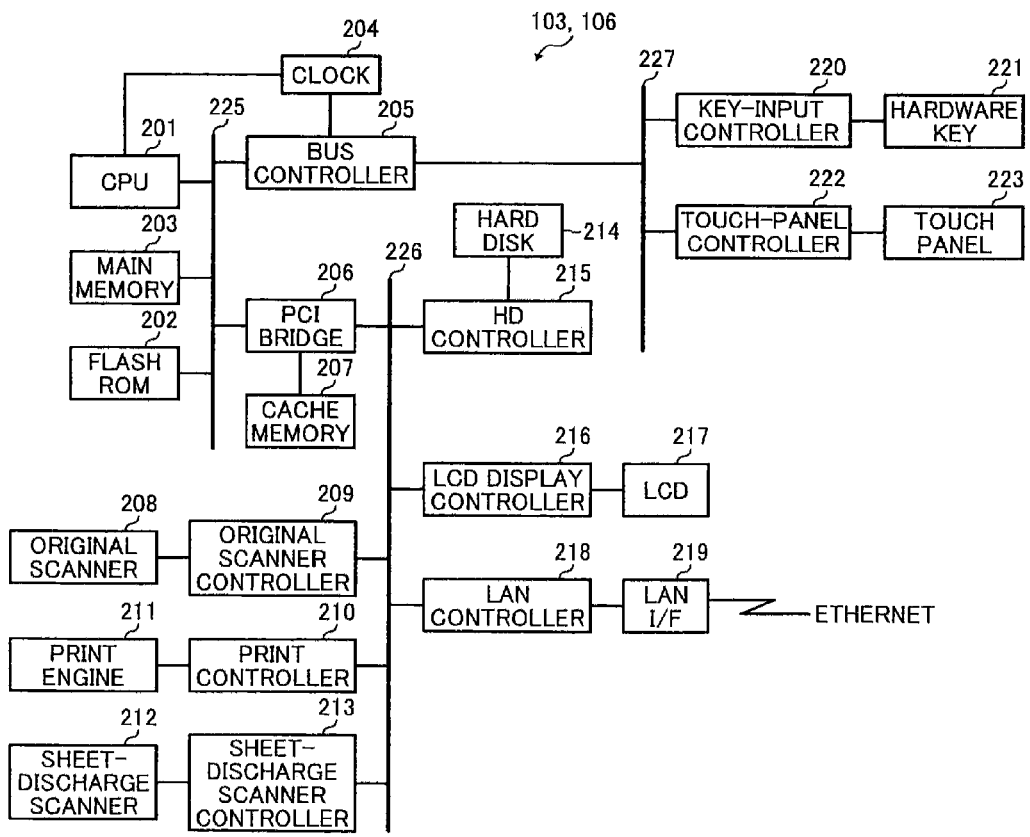
FIG. 2 is a block diagram of a hardware configuration of the MFP shown in FIG. 1.

FIG. 2 is a block diagram of a hardware configuration of each of the MFP 103 and the MFP 106. Each of the MFP 103 and the MFP 106 includes a central processing unit (CPU) 201, a flash read only memory (ROM) 202, a main memory 203, a clock 204, a bus controller 205, a peripheral component interconnect (PCI) bridge 206, and a cache memory 207, which are connected to one another via a CPU bus 225.

Each of the MFP 103 and the MFP 106 also includes an original scanner 208, an original scanner controller 209, a print controller 210, a print engine 211, a sheet-discharge scanner 212, a sheet-discharge scanner controller 213, a hard disk 214, a hard disk (HD) controller 215, a liquid crystal display (LCD) display controller 216, an LCD 217, a local area network (LAN) controller 218, and a LAN interface (I/F) 219, which are connected to one another via a PCI bus 226.

Each of the MFP 103 and the MFP 106 also includes a key-input controller 220, a hardware key 221, a touch-panel controller 222, and a touch panel 223, which are connected to one another via an X bus (internal bus) 227.

In each of the MFP 103 and the MFP 106, the CPU bus 225, the PCI bus 226, and the X bus 227 are connected to one another via the bus controller 205 and the PCI bridge 206.

The CPU 201 executes a control processing program, an operating system (OS), and the like stored in the flash ROM 202. The main memory 203 is formed of a dynamic random access memory (DRAM) and is used as a work area or the like by the CPU 201.

The flash ROM 202 is an electrically rewritable ROM from which data is not deleted after the MFP 103 or the MFP 106 are turned off. The flash ROM 202 stores therein various computer programs for activating a system when the MFP 103 or the MFP 106 is turned on or implementing functions of the MFP 103 or the MFP 106. The flash ROM 202 also stores therein data such as switches or parameters to be referred to when the computer programs are executed.

The clock 204 includes a crystal oscillator (not shown) and a frequency divider (not shown), and generates a clock for controlling operation timings of the CPU 201 and the bus controller 205. The bus controller 205 controls data transfer between the CPU bus 225 and the X bus 227.

The PCI bridge 206 performs data transfer between the PCI bus 226 and the CPU 201 by using the cache memory 207. The cache memory 207 is formed of a DRAM, and is used by the PCI bridge 206.

The original scanner 208 reads an image printed on a sheet by using both a one-dimensional light emitting diode (LED) array as a light source and a color charge coupled device (CCD) line sensor, and converts analog image signals of red (R), green (G), and blue (B) output from the color CCD line sensor into digital image data through analog-to-digital conversion. The original scanner controller 209 controls read operation performed by the original scanner 208, transforms the RGB digital image data input from the original scanner 208 into image data of color-difference components (Cb and Cr) and a brightness component (Y), and performs compression processing (encoding) on the image data based on Joint Photographic Experts Group (JPEG).

The print controller 210 controls operation of the print engine 211. The print engine 211 prints a color image or a monochrome image on a sheet by using toners of cyan, magenta, yellow, and black.

The sheet-discharge scanner 212 reads, similar to the original scanner 208, an image printed on a sheet, and converts read analog image signals into digital image data. The sheet-discharge scanner controller 213 controls operation of reading an original performed by the sheet-discharge scanner 212. The configuration of the sheet-discharge scanner 212 will be described in detail later.

The hard disk 214 stores therein image data and the like input from the original scanner 208 or received via communication. The HD controller 215 functions as an interface with the hard disk 214 and performs high-speed data transfer with the hard disk 214.

The LCD display controller 216 performs digital-to-analog conversion on character data, graphic data, and the like, and performs control to display the data on the LCD 217.

The LAN controller 218 implements a communication protocol based on, for example, Institute of Electrical and Electronics Engineers (IEEE) 802.3 standard, and controls communication with other apparatuses connected to Ethernet (registered trademark) via the LAN I/F 219.

The key-input controller 220 converts serial data input from the hardware key 221 into parallel data. The touch-panel controller 222 detects a portion where an object, such as a finger, being contact with the touch panel 223, and acquires positional information of the contact portion. The touch panel 223 is closely overlapped with the LCD 217.

Figure 3:
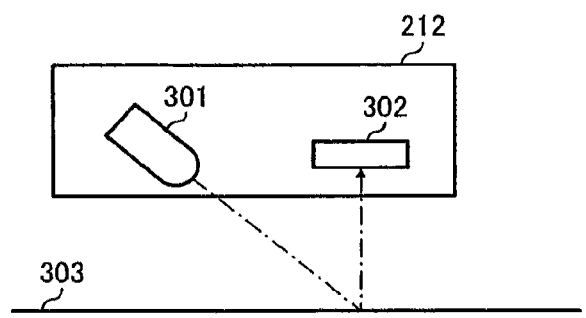
FIG. 3 is a schematic diagram of a configuration of a sheet-discharge scanner shown in FIG. 2.
Figure 4:
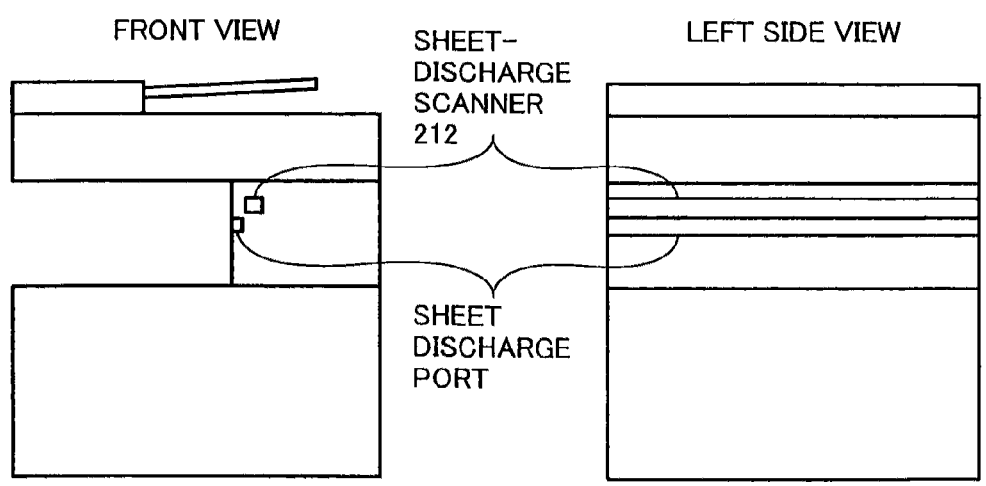
FIG. 4 is a schematic diagram for explaining a position where the sheet-discharge scanner shown in FIG. 3 is mounted.

FIG. 3 is a schematic diagram of a configuration of the sheet-discharge scanner 212. The sheet-discharge scanner 212 includes an LED array 301 and a color CCD line sensor 302. A light emitted from the LED array 301 is reflected by a sheet 303 as a reading object, and then input to the color CCD line sensor 302. The sheet-discharge scanner 212 is, as shown in FIG. 4, mounted inside a sheet discharge port.

Figure 5:
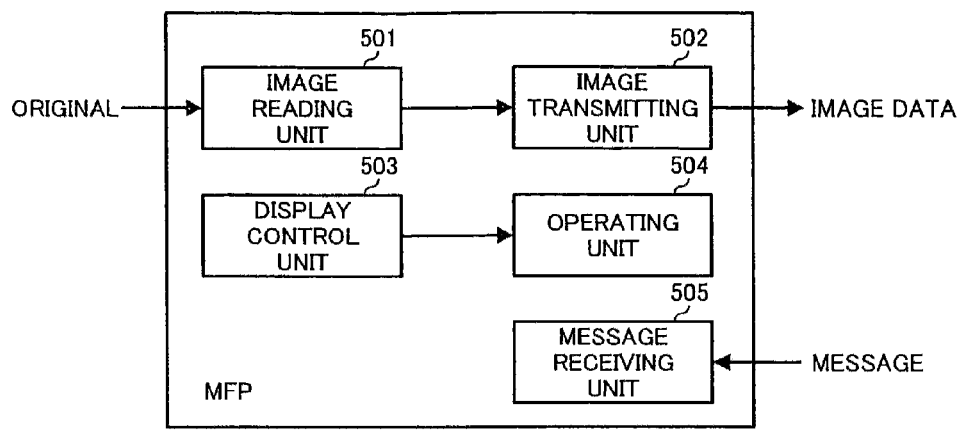
FIG. 5 is a block diagram of a functional configuration of the MFP shown in FIG. 2 when the MFP functions as a transmitting apparatus.

FIG. 5 illustrates a functional configuration of each of the MFP 103 and the MFP 106 when the MFP 103 and the MFP 106 function as transmitting apparatuses.

An image reading unit 501 reads an image of an original by using the original scanner 208 and acquires RGB digital image data. The image reading unit 501 causes the original scanner controller 209 to transform the RGB digital image data into image data of color-difference components (Cb and Cr) and a brightness component (Y), and performs JPEG compression (encoding) on the image data.

An image transmitting unit 502 transmits the image data that has been JPEG-encoded by the image reading unit 501 to other apparatus by implementing a call connection using an SIP defined by Request for Comment (RFC) 3261 and an IP-FAX protocol defined by the Telecommunication Standardization Sector (ITU-T) recommendation T.38. The image transmitting unit 502 functions as, for example, an image-data transmitting unit.

A display control unit 503 controls display processing for displaying various screens on the LCD 217. More particularly, the display control unit 503 controls display of a menu screen for specifying various functions, a screen for inputting transmission destination for IP-FAX transmission, and the like.

An operating unit 504 controls various operation processing based on key data that is input from the hardware key 221 or coordinate data that is input from the touch panel 223.

A message receiving unit 505 receives an SIP instant message transmitted from other apparatus.

Figure 6:
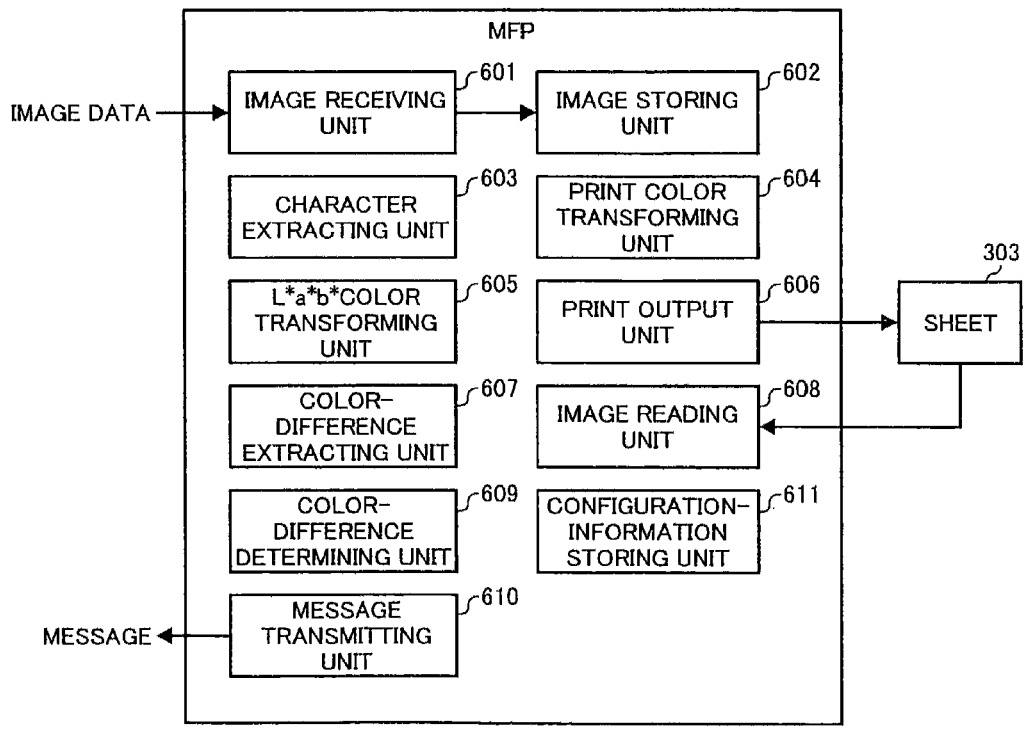
FIG. 6 is a block diagram of a functional configuration of the MFP shown in FIG. 2 when the MFP functions as a receiving apparatus.

FIG. 6 illustrates a functional configuration of each of the MFP 103 and the MFP 106 when the MFP 103 and the MFP 106 function as receiving apparatuses.

An image receiving unit 601 receives, from other IP-FAX machine, JPEG image data by implementing an incoming-call connection using the SIP and the IP-FAX protocol defined by ITU-T recommendation T.38. The image receiving unit 601 functions as, for example, an image-data receiving unit.

An image storing unit 602 stores the JPEG image data received by the image receiving unit 601 in the hard disk 214. The image storing unit 602 functions as, for example, a storing unit.

A character extracting unit 603 extracts a character from the image data based on an algorithm, which will be described later. The character extracting unit 603 functions as, for example, a character extracting unit. A print color transforming unit 604 performs, based on JPEG, expansion processing (decoding) on the JPEG image data stored in the hard disk 214, transforms the image data that has been separated into the color-difference components (Cb and Cd) and the brightness component (Y) into RGB image data, and further transforms the RGB image data into print image data of yellow (Y), magenta (M), cyan (C), and black (K). The print color transforming unit 604 stores the RGB image data transformed from the JPEG image data in the main memory 203 so that the character extracting unit 603 and an L*a*b* color transforming unit 605 can use the RGB image data.

The L*a*b* color transforming unit 605 transforms the RGB image data from RGB to CIEXYZ according to the following Equation (1). Equation (1) is defined by International Radio Consultative Committee (CCIR) 709.

$$\left.\begin{array}{l}X = (0.4124*R + 0.3576*G + 0.1805*B) \times 100 \\ Y = (0.2126*R + 0.7152*G + 0.0722*B) \times 100 \\ Z = (0.0193*R + 0.1192*G + 0.9505*B) \times 100\end{array}\right\} \quad (1)$$

Then, the L*a*b* color transforming unit 605 transforms CIEXYZ into L*a*b* according to the following Equations (2) to (7). Xn, Yn, and Zn in Equations (2) to (5) correspond to values obtained under a D65 light source such that Xn=95.045, Yn=100.000, and Zn=108.892.

$$\left. \begin{array} { l l } { \text{when } X/Xn > 0.008856 } & { Xr = (X/Xn)1/3 } \\ { \text{when } X/Xn \le 0.008856 } & { Xr = 7.787 \times (X/Xn) + 16/116 } \end{array} \right\} \quad (2)$$

$$\left. \begin{array} { l l } { \text{when } Y/Yn > 0.008856 } & { Yr = (Y/Yn)1/3 } \\ { \text{when } Y/Yn \le 0.008856 } & { Yr = 7.787 \times (Y/Yn) + 16/116 } \end{array} \right\} \quad (3)$$

$$\left. \begin{array} { l l } { \text{when } Z/Zn > 0.008856 } & { Zr = (Z/Zn)1/3 } \\ { \text{when } Z/Zn \le 0.008856 } & { Zr = 7.787 \times (Z/Zn) + 16/116 } \end{array} \right\} \quad (4)$$

$$\left. \begin{array} { l l } { \text{when } Y/Yn > 0.008856 } & { L* = 116 \times (Y/Yn)1/3 - 16 } \\ { \text{when } Y/Yn \le 0.008856 } & { L* = 903.29 \times (Y/Yn) } \end{array} \right\} \quad (5)$$

$$a* = 500 \times (Xr - Yr) \quad (6)$$

$$b* = 200 \times (Yr - Zr) \quad (7)$$

A print output unit 606 prints YMCK image data on the sheet 303 by using the print engine 211. The print output unit 606 functions as, for example, an output unit.

A color-difference extracting unit 607 obtains a difference between two colors (i.e., a color difference) based on an algorithm, which will be described later. The color-difference extracting unit 607 functions as, for example, a difference extracting unit.

A color-difference determining unit 609 compares a color difference obtained by the color-difference extracting unit 607 with a predetermined condition stored in advance in the flash ROM 202. The predetermined condition corresponds to an acceptable value of a color difference $\Delta E_{94}$ as a difference condition. The color-difference determining unit 609 functions as, for example, a difference determining unit.

An image reading unit 608 reads the image printed on the sheet 303 by using the sheet-discharge scanner 212, acquires RGB digital image data, and stores the RGB digital image data in the main memory 203 so that the L*a*b* color transforming unit 605 can use the RGB digital image data. The image reading unit 608 transforms the RGB digital image data into image data of color-difference components (Cb and Cr) and a brightness component (Y), and stores the image data of the brightness component (Y) in the main memory 203 so that the character extracting unit 603 can use the image data of the brightness component (Y). The image reading unit 608 functions as, for example, a reading unit.

A message transmitting unit 610 transmits a message by using an SIP instant message.

A configuration-information storing unit 611 stores, in the flash ROM 202, information and the like as a color-difference condition used for determining whether a color of a printed image of the received color image data is different from a color of the image of the original.

A process for making a communication from the MFP 106 at the location B to the MFP 103 at the location A shown in FIG. 1, by using a protocol defined by ITU-T recommendation T.38 is described in detail below with reference to a sequence diagram of FIG. 7.

The MFP 106 transmits an INVITE message containing a FAX number of the MFP 103 to the SIP server 102 (Step S701).

The SIP server 102 refers to a table containing a correspondence between a FAX number and an IP address that have been registered in advance (Step S702), and transmits the INVITE message to the MFP 103 (Step S703).

Upon receiving the INVITE message, the MFP 103 transmits a 200 OK response as a success response to the SIP server 102 (Step S704). Upon receiving the 200 OK response, the SIP server 102 transmits the 200 OK response to the MFP 106 (Step S705).

Upon receiving the 200 OK response, the MFP 106 transmits an ACK message to the MFP 103 to establish a session (Step S706).

Then, the MFP 106 transmits image data to the MFP 103 by implementing a protocol defined by ITU-T recommendation T.38 (Step S707). Upon completing transmission of the image data, the MFP 106 transmits a BYE message to the MFP 103 (Step S708). Then, the MFP 103 transmits the 200 OK response to the MFP 106, so that the session ends (Step S709).

Figure 8:
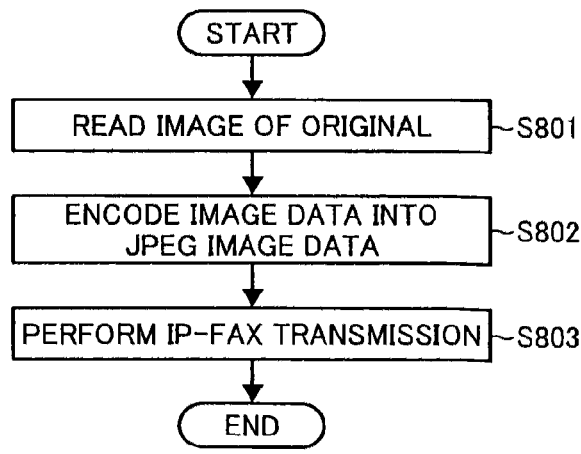
FIG. 8 is a flowchart of a process for transmitting color image data from one MFP to the other MFP according to the first embodiment.

A process for transmitting color image data from the MFP 106 to the MFP 103 is described in detail below with reference to a flowchart of FIG. 8.

The process starts when a person who transmits color image data (hereinafter, referred to as "sender" as appropriate) sets a color original on the original scanner 208, inputs the FAX number of the MFP 103, and presses a start key. Then, the image reading unit 501 controls the original scanner controller 209 to read an image of the original by using the original scanner 208, and acquires RGB digital image data (Step S801).

The read RGB image data is transformed into image data of color-difference components (Cb and Cr) and a brightness component (Y) and then JPEG encoding is performed (Step S802).

Figure 7:
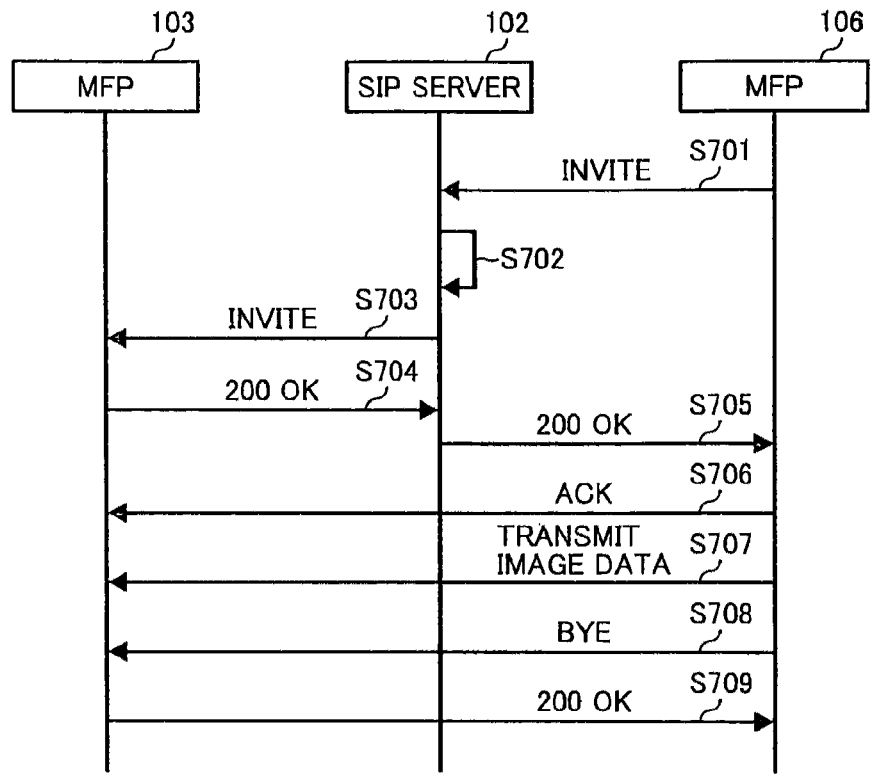
FIG. 7 is a sequence diagram of communication operation using a protocol defined by the Telecommunication Standardization Sector (ITU-T) recommendation T.38 according to the first embodiment.

The image transmitting unit 502 transmits the JPEG-encoded image data to the MFP 103 according to the communication processing procedure shown in FIG. 7 (Step S803).

A process for receiving, by the MFP 103, the color image data transmitted from the MFP 106 is described in detail below with reference to a flowchart of FIG. 9.

The MFP 103 determines whether the image receiving unit 601 has received the JPEG image data transmitted from the MFP 106 (Step S901). When the JPEG image data has been received, process control proceeds to Step S902. On the other hand, when the JPEG image data has not been received, processing at Step S901 is repeated.

The image storing unit 602 stores the received JPEG image data in the hard disk 214 (Step S902).

The print color transforming unit 604 performs the expansion processing (decoding) based on JPEG on the JPEG image data stored in the hard disk 214, transforms image data that has been separated into the color-difference components (Cb and Cr) and the brightness component (Y) into RGB image data, and further transforms the RGB image data into YMCK print image data. At the same time, the print color transforming unit 604 stores, in the main memory 203, the image data of the brightness component (Y) obtained through the JPEG expansion for use by the character extracting unit 603 and the RGB image data transformed from the image data of the color-difference components (Cb and Cr) and the brightness component (Y) for use by the L*a*b* color transforming unit 605 (Step S903).

Then, the print output unit 606 prints the YMCK image data on the sheet 303 by using the print engine 211 (Step S904).

When the printed sheet passes through the sheet discharge port, the image reading unit 608 reads the image printed on the sheet 303 by using the sheet-discharge scanner 212, acquires RGB image data, and stores the RGB image data in the main memory 203 for use by the L*a*b* color transforming unit 605 (Step S905).

The image reading unit 608 transforms the RGB image data into image data of color-difference components (Cb and Cr) and a brightness component (Y), and stores the image data of the brightness component (Y) in the main memory 203 for use by the character extracting unit 603 (Step S906).

The character extracting unit 603 compares the image data of the brightness component (Y) stored by the print color transforming unit 604 with a predetermined brightness value previously stored as a threshold level in the flash ROM 202. Then, the character extracting unit 603 transforms the image data into image data of a binary image by processing the image data equal to or larger than the threshold level as a white pixel (i.e. bit value=0) and the image data smaller than the threshold level as a black pixel (i.e., bit value=1). The character extracting unit 603 then extracts a character image from the binary image and performs character recognition on the character image (Step S907). The extraction of the character image and the character recognition are preformed by using a method disclosed in, for example, TOSHIBA REVIEW 1997 VOL. 52 No. 2.

Figure 10:
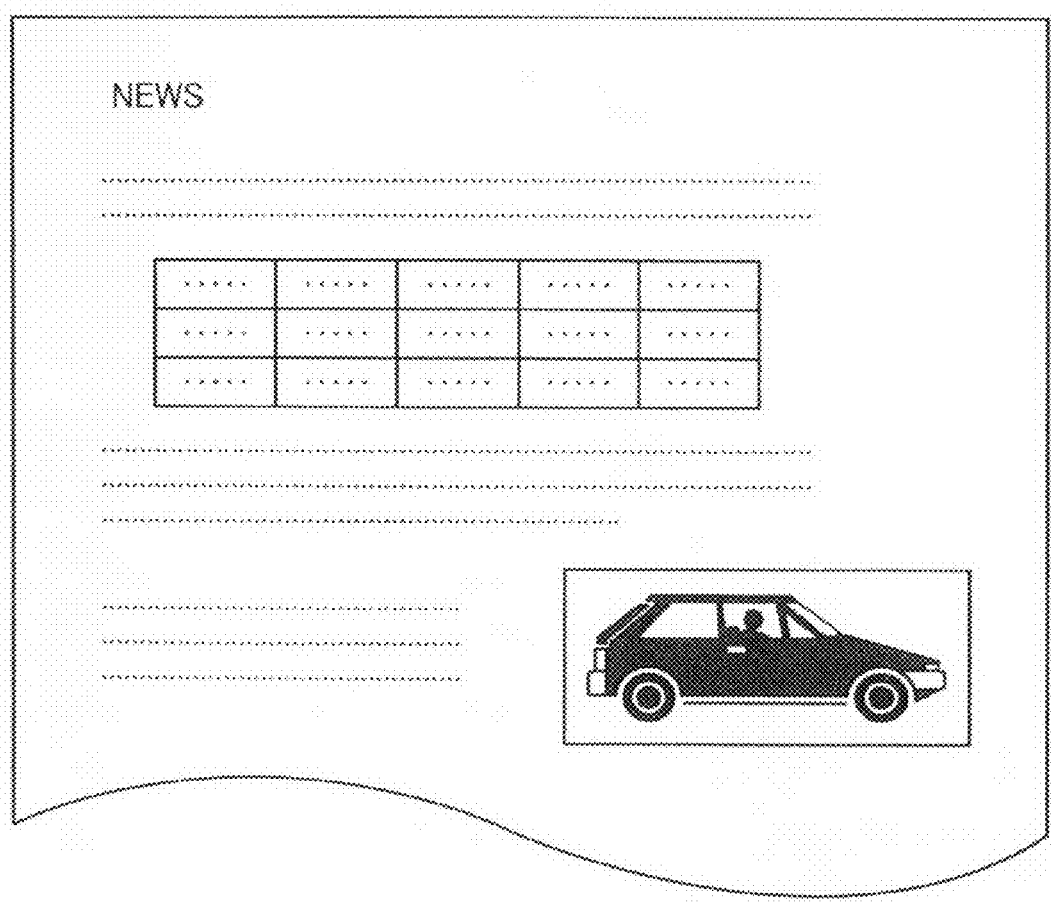
FIG. 10 is an example of a binary image according to the first embodiment.

FIG. 10 illustrates an example of the binary image. In this example, characters other than "NEWS" are indicated by ". . .". In the binary image shown in FIG. 10, each of the characters "N", "E", "W", and "S" is recognized through the character recognition. When a character string on the first row (in the example of FIG. 10, "NEWS") is recognized from the binary image, the character extracting unit 603 performs, in the above-described manner, binary-image transform, character-image extraction, and character recognition on the image data of the brightness component (Y) that has been generated by the image reading unit 608 by causing the sheet-discharge scanner 212 to read the image printed on the sheet 303. As a result, each of the characters "N", "E", "W", and "S" is recognized.

The character extracting unit 603 compares a character string recognized from the image data of the brightness component (Y) stored by the print color transforming unit 604 with a character string recognized from the image data of the brightness component (Y) stored by the image reading unit 608 (Step S908).

When the character strings are not identical to each other (NO at Step S908), the message transmitting unit 610 transmits a message indicating that a color of the printed image cannot be compared with a color of the image of the original to the MFP 106 as a transmission source terminal (Step S909). At this time, the message transmitting unit 610 transmits the message to the MFP 106 by using the SIP instant message.

When the character strings are identical to each other (YES at Step S908), process control proceeds to a subsequent process in which the RGB image data corresponding to the character image extracted from the binary image through the character recognition is transformed into L*a*b*. In the first embodiment, a method for transforming the RGB image data into L*a*b* is employed so that a condition, which will be described later, can be evaluated easily.

The character extracting unit 603 sends image data of a character image area (a rectangular area) corresponding to binarized "N" in the image data of the brightness component (Y) stored by the print color transforming unit 604 and image data corresponding to the rectangular area in the RGB image data stored by the print color transforming unit 604 to the L*a*b* color transforming unit 605. The L*a*b* color transforming unit 605 transforms RGB data of each pixel corresponding to a black pixel (i.e., pixel value=1) among binary pixels contained in the rectangular area into L*a*b* according to Equations (1) to (7) described above. If a pixel contained in the character "N" corresponds to red, a* of the pixel is equal to a positive large value, b* is equal to either a positive small value or a negative small value, and L* is equal to a value in a range from around 40 to around 60. Then, the L*a*b* color transforming unit 605 calculates an average of each of L*, a*, and b* for the pixel that has been transformed into L*a*b* (Step S910). At this time, it is possible to eliminate pixels having values largely exceeding the average.

Then, the character extracting unit 603 sends image data of a character image area (a rectangular area) corresponding to the binarized "N" in the image data of the brightness component (Y) stored by the image reading unit 608 and image data corresponding to the rectangular area in the RGB image data stored by the image reading unit 608 to the L*a*b* color transforming unit 605. The L*a*b* color transforming unit 605 transforms, similar to the above, RGB data of each pixel corresponding to a black pixel (i.e., pixel value=1) among binary pixels into L*a*b*, and calculates an average of each of L*, a*, and b* (Step S911).

Then, a process for obtaining a color difference as color-difference information from two L*a*b* values is performed. In the first embodiment, $\Delta E_{94}$ (CIE 1994) is employed as the color difference. A calculation for obtaining the color difference $\Delta E_{94}$ is performed by the color-difference extracting unit 607 according to the following Equations (8) and (9) assuming that the two L*a*b* values are $(L_1, a_1, b_1)$ and $(L_2, a_2, b_2)$ (Step S912).

$$\Delta E = \sqrt{(L_1-L_2)^2 + (a-a_2)^2 + (b_1-b_2)^2} \quad (8)$$

$$\Delta E_{94} = \sqrt{(L_1-L_2)^2 + \Delta C^2 + \Delta H^2} \quad (9)$$

$$*\Delta C = (\sqrt{a_1^2+b_1^2} - \sqrt{a_2^2+b_2^2})/(1+0.045C^*)$$

$$*\Delta H = \sqrt{(\Delta E^2 - \Delta C^2 - (L1-L2)^2)}/(1+0.015 \times C^*)$$

$$*C^* = \sqrt{a_1^2+b_1^2}$$

The color-difference determining unit 609 compares the obtained value of the color difference $\Delta E_{94}$ with a value of the predetermined condition stored in advance in the flash ROM 202 (Step S913).

When the obtained value of the color difference $\Delta E_{94}$ is larger than the value of the difference condition (NO at Step S913), the message transmitting unit 610 transmits a message indicating that the color of the printed image on the sheet 303 is different from the color of the image of the original to the MFP 106 as the transmission source terminal (Step S914). At this time, the message transmitting unit 610 transmits the message to the MFP 106 by using the SIP instant message.

On the other hand, when the obtained value of the color difference $\Delta E_{94}$ is smaller than the value of the difference condition (YES at Step S913), the JPEG image data that has been received and stored in the hard disk 214 is deleted (Step S915). Because the stored JPEG image data is deleted when the value of the color difference $\Delta E_{94}$ is smaller than the value of the difference condition and the stored JPEG image data is maintained when the value of the color difference $\Delta E_{94}$ is larger than the value of the difference condition, it is possible to keep storing the JPEG image data when the quality of the printed image is not at a desired level for a sender of the image. Thus, the JPEG image data can be maintained, so that, when color toner is insufficient, the maintained JPEG image data can be reprinted by supplying the color toner. As a result, it is possible to repeat the above-described process for comparing the color of the printed image with the color of the image of the original.

In this manner, the MFP according to the first embodiment is configured to, when there is a difference equal to or larger than a predetermined threshold between the received image data and the printed image data of the received image data, notify the transmission source terminal of information about the difference. Therefore, the sender of the image data can check the quality of the printed image.

In the above description, it is explained that the image printed on the sheet 303 is read by the sheet-discharge scanner 212. However, it is possible to read the sheet 303 by the original scanner 208 after the sheet 303 is discharged. With this configuration, the present invention can be implemented without mounting the sheet-discharge scanner 212 at the sheet discharge port.

In the above description, the color difference $\Delta E_{94}$ is calculated by comparing colors of pixels contained in a character. However, when the character is surrounded by white pixels, the color difference $\Delta E_{94}$ can be calculated by calculating an average of colors of pixels contained in an area including the white pixels and comparing colors in the entire area with one another. A processing procedure in this case is described below.

When the L*a*b* color transforming unit 605 calculates an average of each of L*, a*, and b*, the L*a*b* color transforming unit 605 transforms RGB data of each white pixel (i.e., bit value=0) among binary pixels in a character image area (a rectangular area) into L*a*b*. If a pixel contained in the character "N" corresponds to red, a* of the pixel is equal to a positive large value, b* of the pixel is equal to either a positive small value or a negative small value, and L* of the pixel is equal to a value in a range from around 40 to around 60. Furthermore, if other pixels in the rectangular area correspond to white, a* and b* of the pixels are equal to either positive small values or negative small values and L* is equal to a value near 100 (the range of L* is from 0 (black) to 100 (white)). Therefore, when a pixel that is not contained in the character but contained in the rectangular area has a* and b* equal to either positive small values or negative small values and L* equal to near 100, the L*a*b* color transforming unit 605 identifies colors of the pixels as white. Then, if all pixels that are not contained in the character but contained in the rectangular area are identified as white pixels, the L*a*b* color transforming unit 605 calculates an average of each of a* and b* for all pixels in the rectangular area. Regarding L*, the L*a*b* color transforming unit 605 calculates an average of L* for pixels remaining after pixels that have values near 100 and are identified as white pixels are eliminated. Then, a color-difference extracting unit 507 calculates the color difference $\Delta E_{94}$.

In the first embodiment, the message indicating that the printed image data is different from the received image data is transmitted by using the SIP instant message. However, in a second embodiment of the present invention, an example is described in which the message is transmitted to an e-mail address of a sender of the image data, in addition to transmission of the SIP instant message. The components assigned with the same reference symbols as those in the first embodiments are the same components as those described in the first embodiment, and therefore, explanation thereof are omitted.

Figure 11:
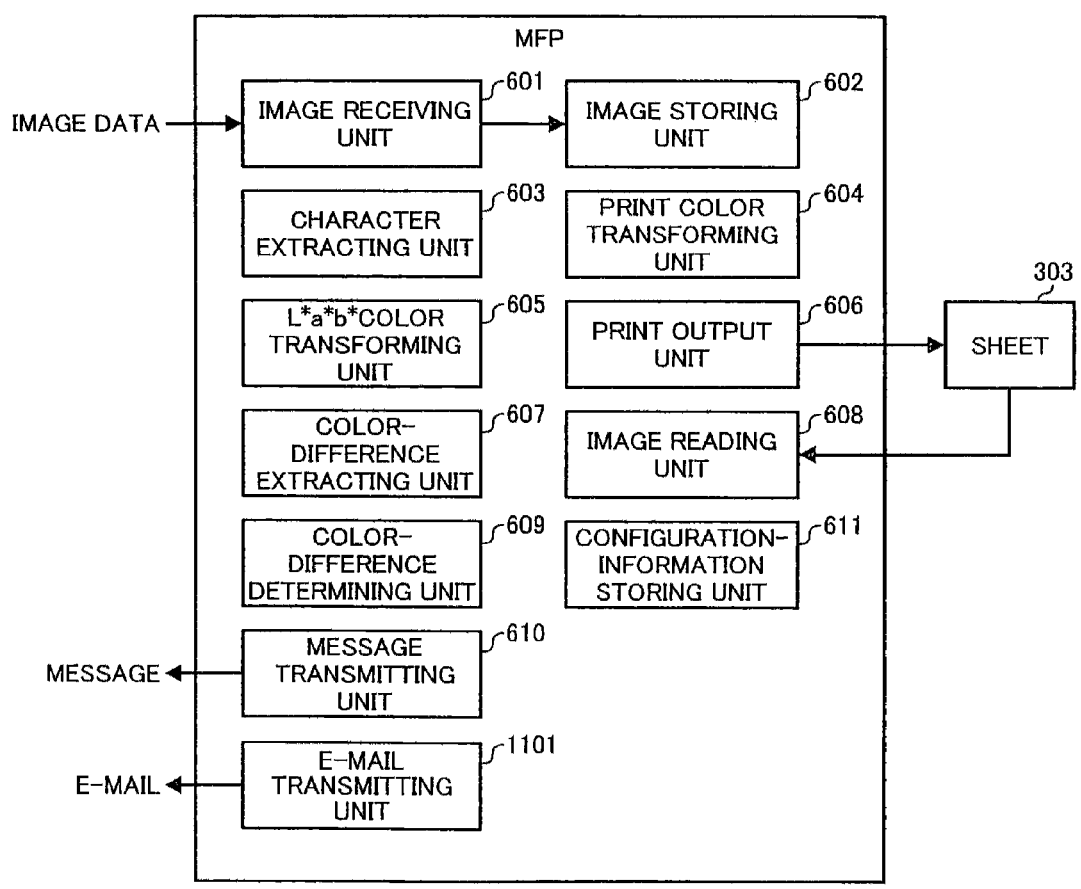
FIG. 11 is a block diagram of a functional configuration of an MFP according to a second embodiment of the present invention when the MFP functions as a receiving apparatus.

FIG. 11 is a block diagram of a functional configuration of each of the MFP 103 and the MFP 106 when the MFP 103 and the MFP 106 function as receiving apparatuses. In the functional configuration shown in FIG. 11, an e-mail transmitting unit 1101 that controls e-mail transmission to a specified e-mail address is added to the functional configuration shown in FIG. 6.

A process for transmitting color image data from the MFP 106 to the MFP 103 is described in detail below with reference to a flowchart of FIG. 8.

The process starts when a sender sets a color original on the original scanner 208, inputs an e-mail address of the sender and the FAX number of the MFP 103, and presses a start key. Then, the image reading unit 501 controls the original scanner controller 209 to read an image of the original by using the original scanner 208, and acquires RGB digital image data (Step S801). The read RGB image data is transformed into image data of the color-difference components (Cb and Cr) and the brightness component (Y) and then JPEG encoding is performed (Step S802). The image transmitting unit 502 transmits the JPEG-encoded image data to the MFP 103 according to the communication processing procedure shown in FIG. 7 (Step S803).

Figure 12:
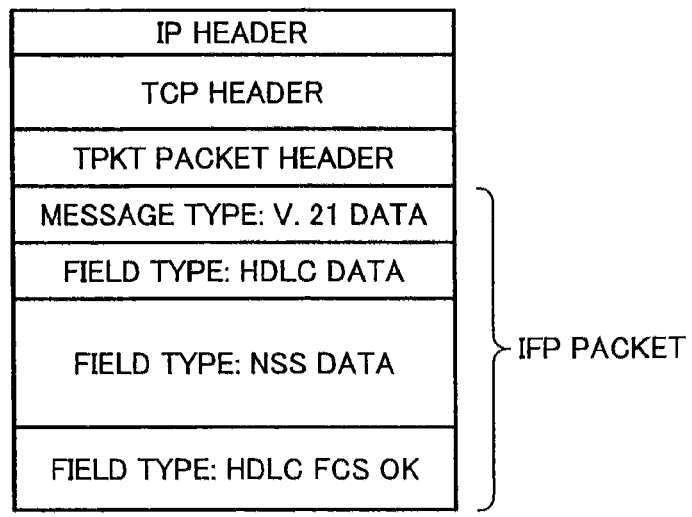
FIG. 12 is a schematic diagram of a data structure of a transmission control protocol (TCP) packet according to the second embodiment.
Figure 13:
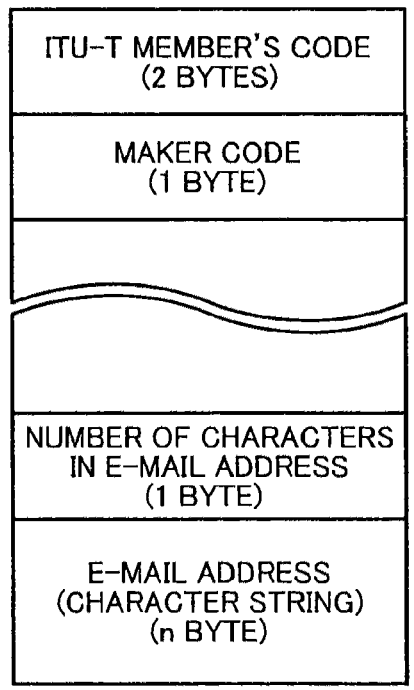
FIG. 13 is an example of contents of a Non-Standard Facilities Set-up (NSS) command containing an e-mail address according to the second embodiment.

At this time, the MFP 106 puts the e-mail address of the sender in a Non-Standard Facilities Set-up (NSS) command and transmits the NSS command according to the protocol defined by ITU-T recommendation T.38 to the MFP 103. While the NSS command is a command defined by ITU-T recommendation T.30, ITU-T recommendation T.38 incorporates ITU-T recommendation T.30 such that a High-level Data Link Control procedure (HDLC) frame such as the NSS defined by ITU-T recommendation T.30 is put in an Internet Facsimile Protocol (IFP) packet, and the IFP packet is put in either an UDP packet or a TCP packet when being transmitted. The data structure of the TCP packet is illustrated in FIG. 12. An example of contents of the NSS command containing an e-mail address is illustrated in FIG. 13. In FIG. 13, the first byte of ITU-T member's code is an ITU-T country code.

Figure 14A:
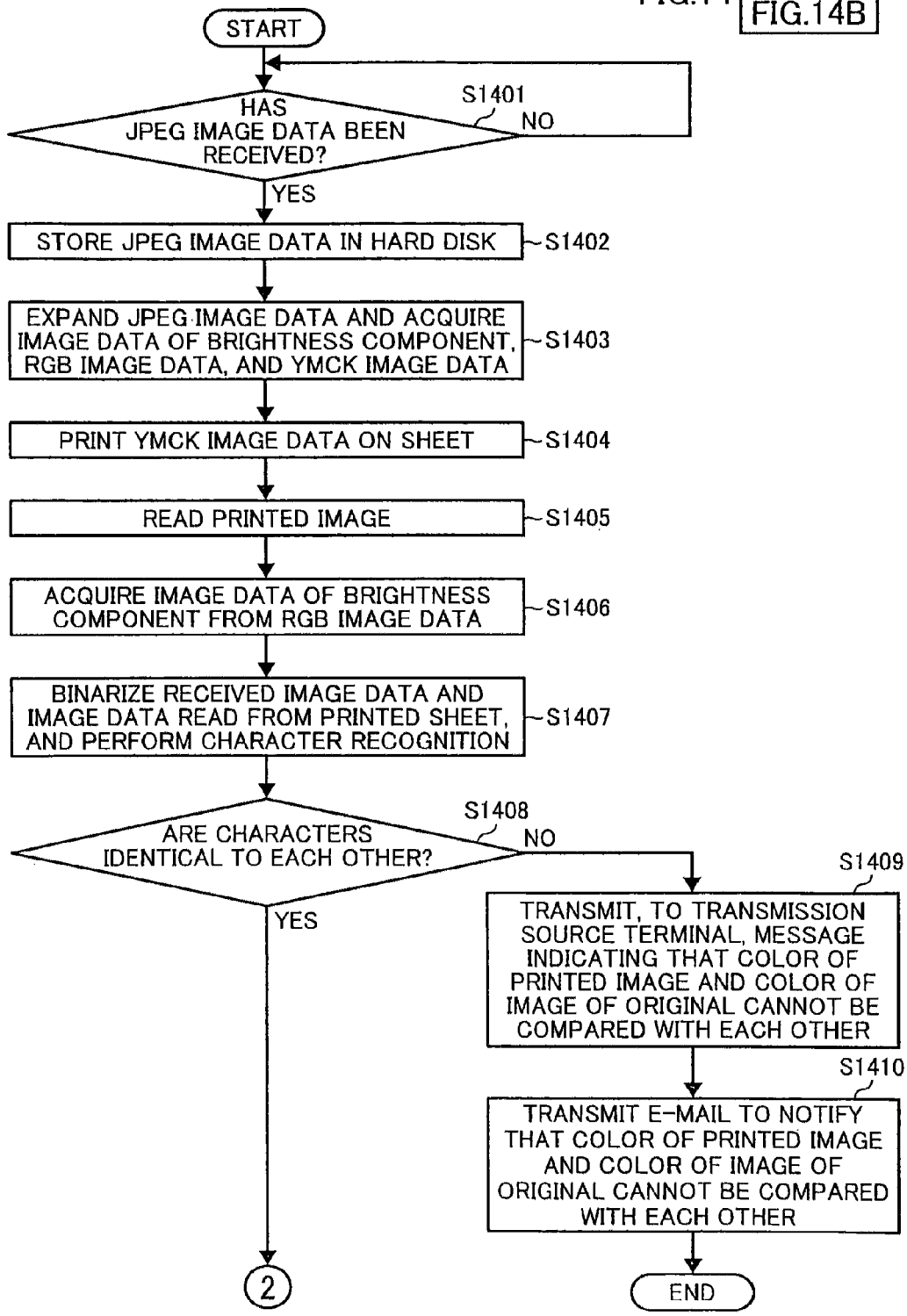
FIG. 14 is a flowchart of a process performed by one MFP for receiving color image data transmitted from the other MFP according to the second embodiment.
Figure 14B:
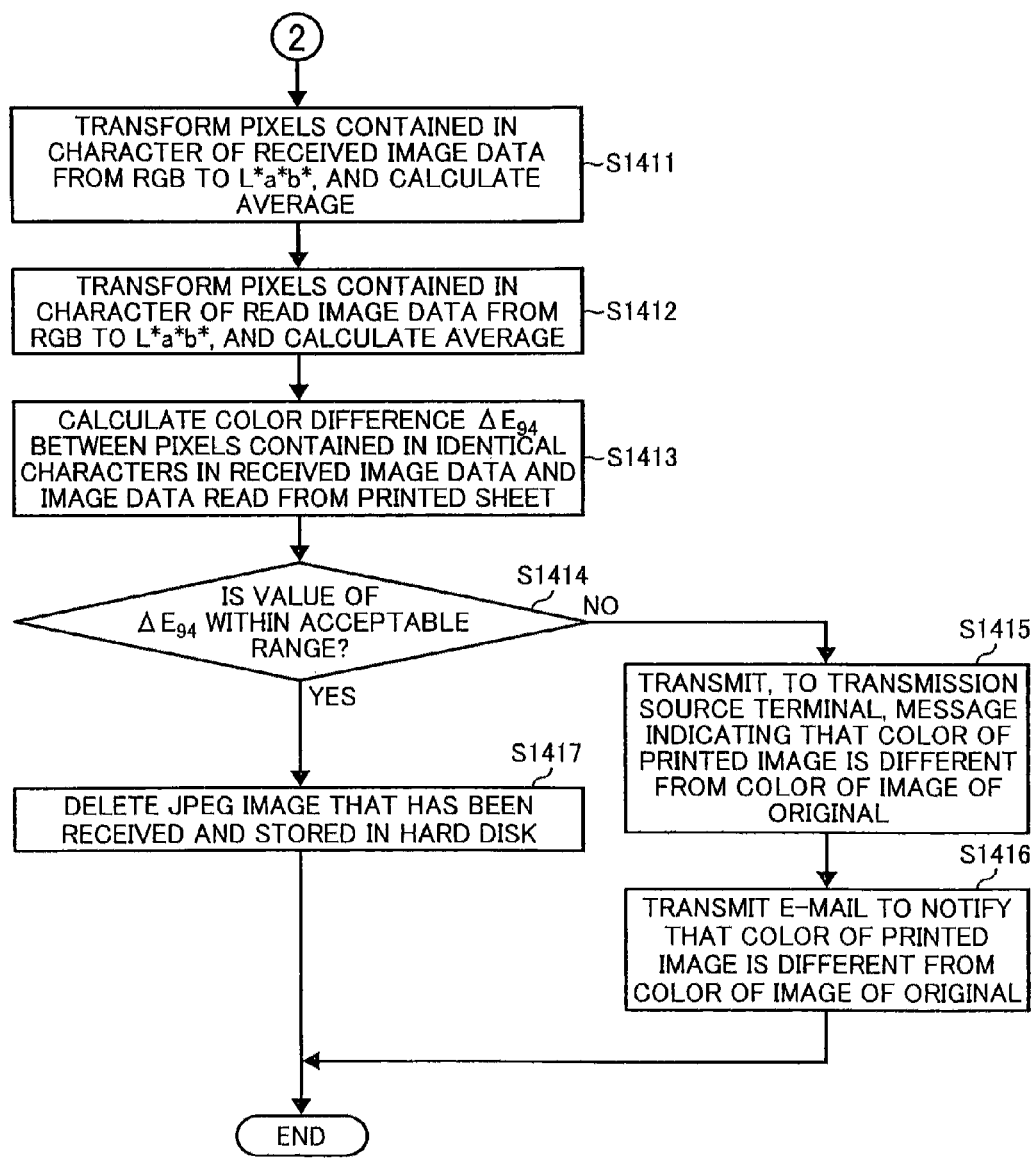

A process for receiving, by the MFP 103, JPEG image data transmitted from the MFP 106 is described in detail below with reference to a flowchart of FIG. 14.

Figure 9B:
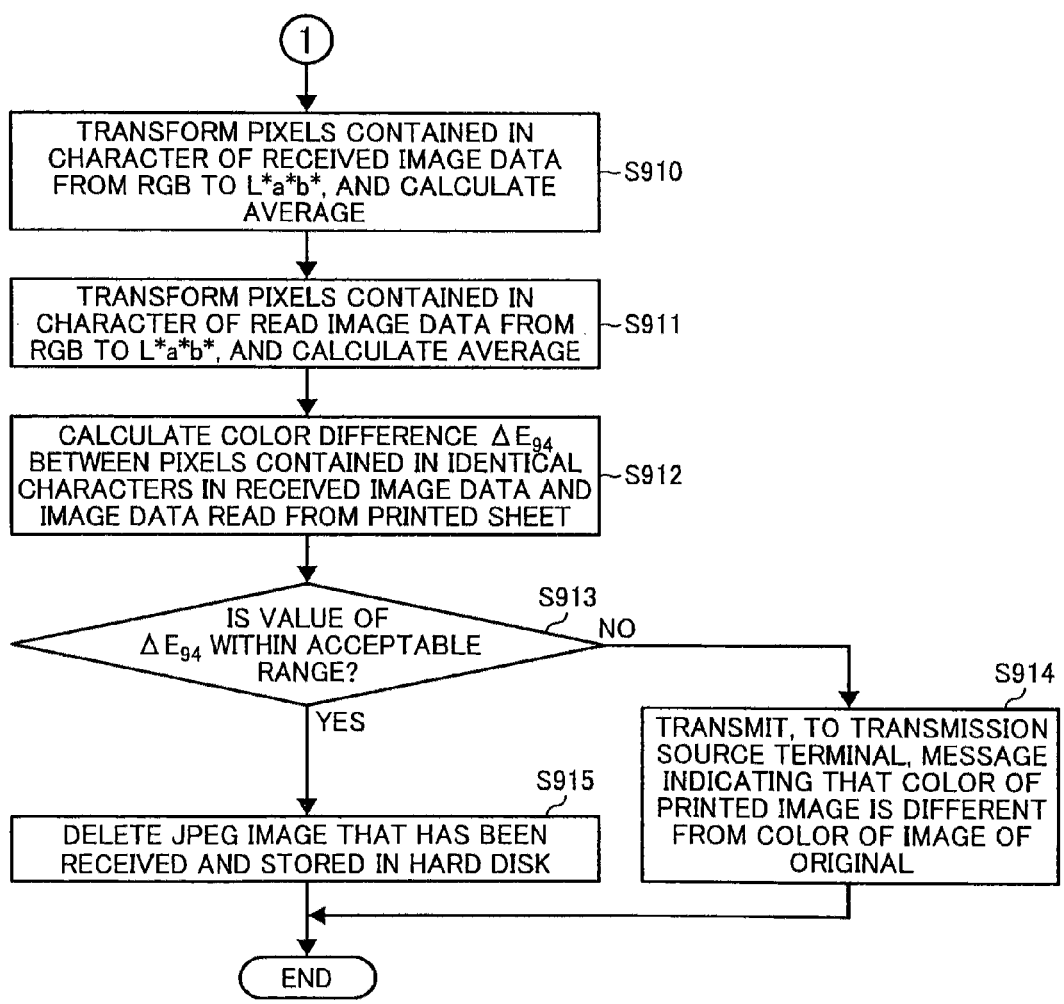
FIG. 9 is a flowchart of a process performed by one MFP for receiving color image data transmitted from the other MFP according to the first embodiment.

Processes from Step S1401 to Step S1408 are the same as those performed at Step S901 to Step S908 of FIG. 9, so that the same explanation is not repeated. When the character strings are not identical to each other (NO at Step S1408), the message transmitting unit 610 transmits a message indicating that a color of the printed image cannot be compared with a color of the image of the original to the MFP 106 as a transmission source terminal (Step S1409). At this time, the message transmitting unit 610 transmits the message to the MFP 106 by using the SIP instant message.

Then, the e-mail transmitting unit 1101 transmits an e-mail containing the same information as the message to the e-mail address contained in the received NSS command (Step S1410). For convenience of explanation of the flowchart, the message is transmitted at Step S1409 and then the e-mail is transmitted at Step S1410; however, transmission orders can be switched from each other.

When the character strings are identical to each other (YES at Step S1408), process control proceeds to a subsequent process in which the RGB image data corresponding to the character image extracted from the binary image through the character recognition is transformed into L*a*b*.

Processes from Step S1411 to Step S1414 are the same as those performed at Step S910 to Step S913 of FIG. 9, so that the same explanation is not repeated. When the obtained value of the color difference $\Delta E_{94}$ is larger than the value of the difference condition (NO at Step S1414), the message transmitting unit 610 transmits a message indicating that the color of the printed image on the sheet 303 is different from the color of the image of the original to the MFP 106 as the transmission source terminal (Step S1415). At this time, the message transmitting unit 610 transmits the message to the MFP 106 by using the SIP instant message.

Then, the e-mail transmitting unit 1101 transmits an e-mail containing the same information as the message to the e-mail address contained in the received NSS command (Step S1416). For convenience of explanation of the flowchart, the message is transmitted at Step S1415 and then the e-mail is transmitted at Step S1416; however, transmission orders can be switched from each other.

On the other hand, when the obtained value of the color difference $\Delta E_{94}$ is smaller than the value of the difference condition (YES at Step S1414), the JPEG image data that has been received and stored in the hard disk 214 is deleted (Step S1417). Because the stored JPEG image data is deleted when the value of the color difference $\Delta E_{94}$ is smaller than the value of the difference condition and the stored JPEG image data is maintained when the value of the color difference $\Delta E_{94}$ is larger than the value of the difference condition, it is possible to keep storing the JPEG image data when the quality of the printed image is not at a desired level for the sender of the image. Thus, the JPEG image data can be maintained, so that, when color toner is insufficient, the maintained JPEG image data can be reprinted by supplying the color toner. As a result, it is possible to repeat the above-described process for comparing the color of the printed image with the color of the image of the original.

In this manner, the MFP according to the second embodiment is configured to, when there is a difference equal to or larger than a predetermined threshold between the received image data and the printed image data of the received image data, send information about the difference to the transmission source terminal and the e-mail address of the sender. Therefore, the sender of the image data can check the quality of the printed image even when the sender does not stay near the transmission source terminal.

In the above description, it is explained that the image printed on the sheet 303 is read by the sheet-discharge scanner 212. However, it is possible to read the sheet 303 by the original scanner 208 after the sheet 303 is discharged. With this configuration, the present invention can be implemented without mounting the sheet-discharge scanner 212 at the sheet discharge port.

In the above example, when the e-mail is transmitted at Step S1410 or Step S1416, it is possible to attach the image data read at Step S1405 to the e-mail. Accordingly, the sender of the image data can check the quality of the printed image by viewing the attached printed image data.

If an e-mail address of an administrator of the MFP 103 is registered in the MFP 103 (the information about the e-mail address is stored in the flash ROM 202), it is possible to send the message indicating that the color of the printed image is different from the color of the image of the original to the e-mail address of the administrator. In this case, the administrator can be promptly notified that the quality of color has degraded, so that he/she can promptly perform necessary troubleshooting such as supplying of toner, fixing of an apparatus, or adjustment of the apparatus.

In the first embodiment, the message indicating that the printed image data is different from the received image data is transmitted by using the SIP instant message. However, in a third embodiment of the present invention, an example is described in which the read image data is transmitted in addition to the SIP instant message. The components assigned with the same reference symbols as those in the first embodiments are the same components as those described in the first embodiment, and therefore, explanation thereof are omitted.

Figure 15:
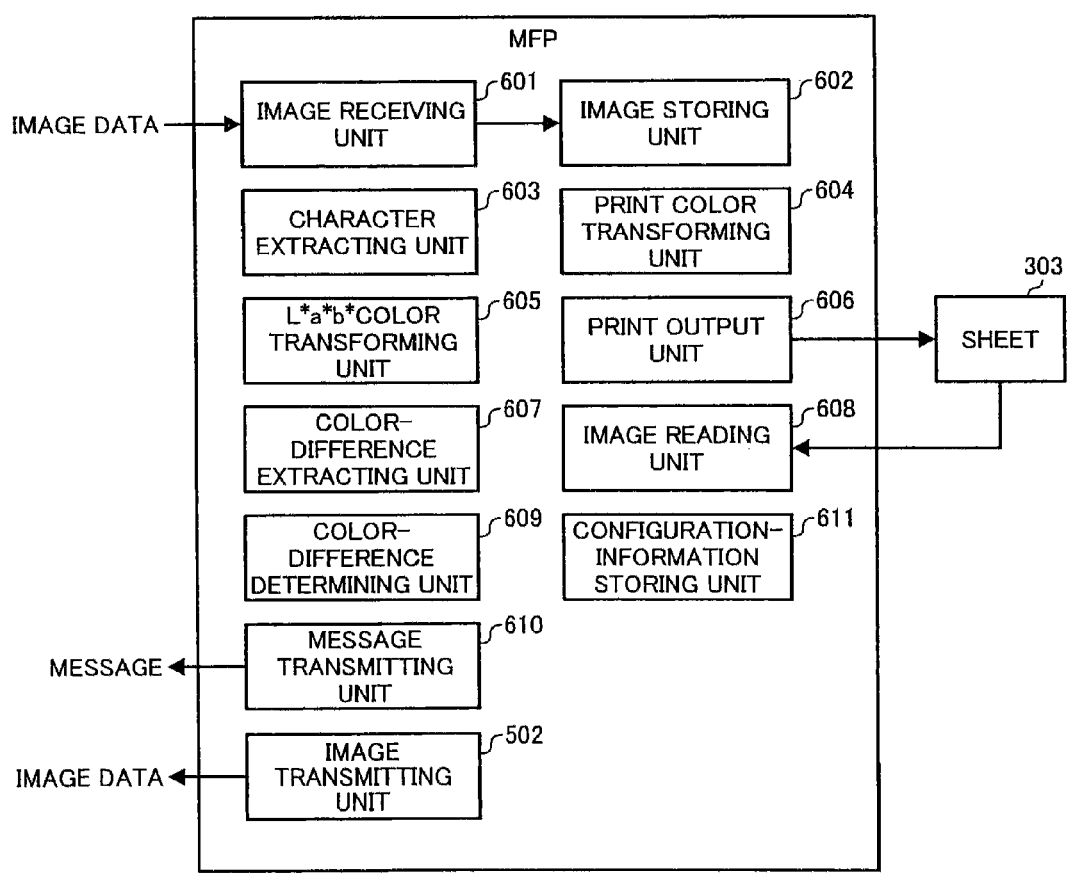
FIG. 15 is a block diagram of a functional configuration of an MFP according to a third embodiment of the present invention when the MFP functions as a receiving apparatus.

FIG. 15 is a block diagram of a functional configuration of each of the MFP 103 and the MFP 106 when the MFP 103 and the MFP 106 function as receiving apparatuses. In the functional configuration shown in FIG. 15, the image transmitting unit 502 is added to the functional configuration shown in FIG. 6.

The image transmitting unit 502 has the same functions as those of the image transmitting unit 502 in FIG. 5, which illustrates the configuration of the MFP 103 and the MFP 106 as the transmitting apparatuses. The image transmitting unit 502 transmits the JPEG-encoded image data to other apparatus by implementing the call connection using an SIP defined by Request for Comments (RFC) 3261 and the IP-FAX protocol defined by ITU-T recommendation T.38. The image transmitting unit 502 functions as, for example, an image-data transmitting unit.

A process for transmitting color image data from the MFP 106 to the MFP 103 is the same as that described above with reference to FIG. 8 (Step S801 to Step S803).

Figure 16B:
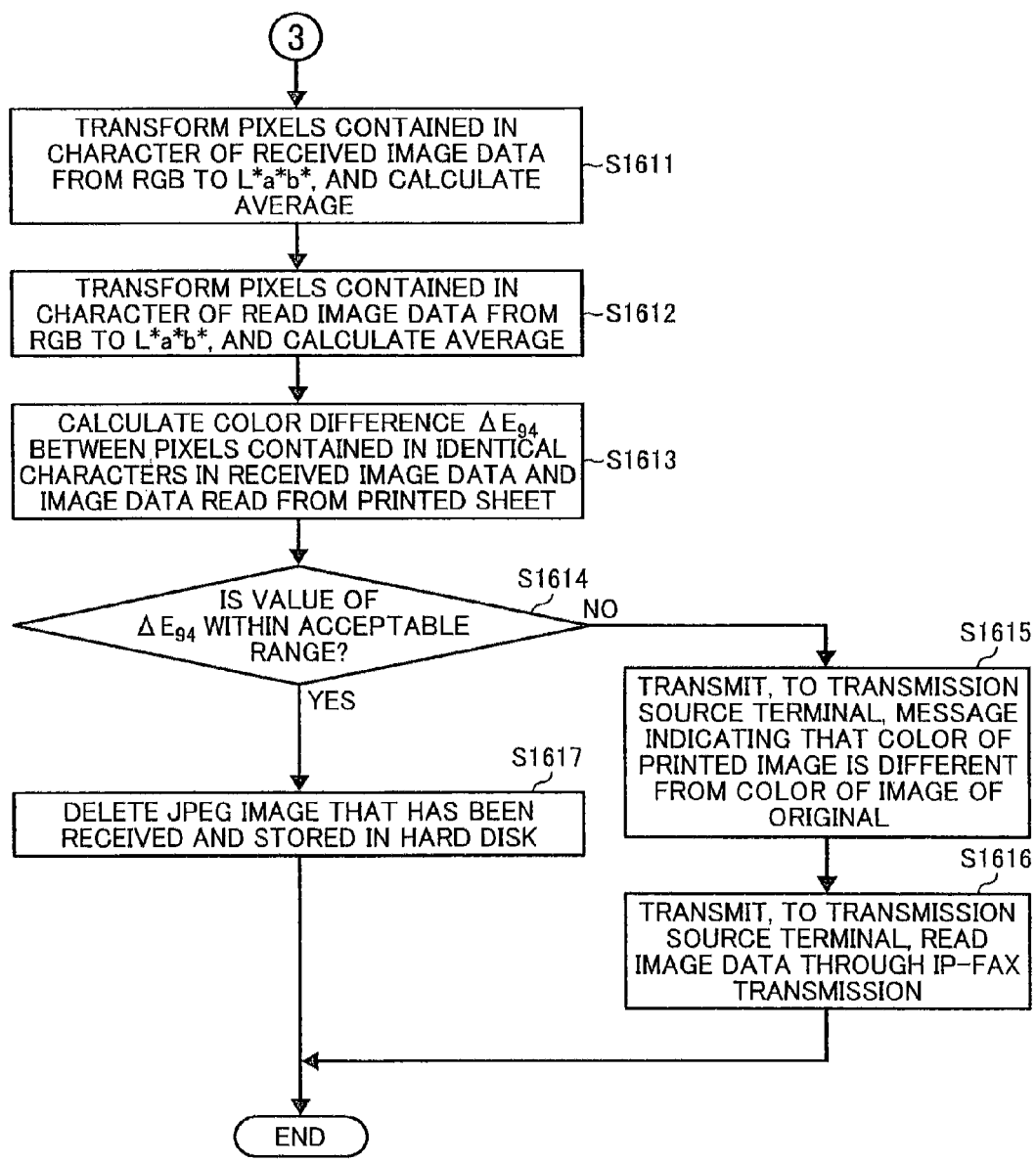
FIG. 16 is a flowchart of a process performed by one MFP for receiving color image data transmitted from the other MFP according to the third embodiment.

A process for receiving, by the MFP 103, the JPEG image data from the MFP 106 is described in detail below with reference to a flowchart of FIG. 16.

Processes from Step S1601 to Step S1608 are the same as those performed at Step S901 to Step S908 of FIG. 9, so that the same explanation is not repeated. When the character strings are not identical to each other (NO at Step S1608), the message transmitting unit 610 transmits a message indicating that a color of the printed image cannot be compared with a color of the image of the original to the MFP 106 as a transmission source terminal (Step S1609). At this time, the message transmitting unit 610 transmits the message to the MFP 106 by using the SIP instant message.

Then, the image transmitting unit 502 transmits the image data read at Step S1605 to the MFP 106 as the transmission source terminal by implementing the protocol defined by ITU-T recommendation T.38 (Step S1610). For convenience of explanation of the flowchart, the message is transmitted at Step S1609 and then the image data is transmitted at Step S1610; however, transmission orders can be switched from each other.

When the character strings are identical to each other (YES at Step S1608), process control proceeds to a subsequent process in which the RGB image data corresponding to the character image extracted from the binary image through the character recognition is transformed into L*a*b*.

Processes from Step S1611 to Step S1614 are the same as those performed at Step S910 to Step S913 of FIG. 9, so that the same explanation is not repeated. When the obtained value of the color difference $\Delta E_{94}$ is larger than the value of the difference condition (NO at Step S1614), the message transmitting unit 610 transmits a message indicating that the color of the printed image on the sheet 303 is different from the color of the image of the original to the MFP 106 as the transmission source terminal (Step S1615). At this time, the message transmitting unit 610 transmits the message to the MFP 106 by using the SIP instant message.

Then, the image transmitting unit 502 transmits the image data read at Step S1605 to the MFP 106 as the transmission source terminal by implementing the protocol defined by ITU-T recommendation T.38 (Step S1616). For convenience of explanation of the flowchart, the message is transmitted at Step S1615 and then the image data is transmitted at Step S1616; however, transmission orders can be switched from each other.

On the other hand, when the obtained value of the color difference $\Delta E_{94}$ is smaller than the value of the difference condition (YES at Step S1614), the JPEG image data that has been received and stored in the hard disk 214 is deleted (Step S1617). Because the stored JPEG image data is deleted when the value of the color difference $\Delta E_{94}$ is smaller than the value of the difference condition and the stored JPEG image data is maintained when the value of the color difference $\Delta E_{94}$ is larger than the value of the difference condition, it is possible to keep storing the JPEG image data when the quality of the printed image is not at a desired level for a sender of the image. Thus, the JPEG image data can be maintained, so that, when color toner is insufficient, the maintained JPEG image data can be reprinted by supplying the color toner. As a result, it is possible to repeat the above-described process for comparing the color of the printed image with the color of the image of the original.

In this manner, the MFP according to the third embodiment is configured to, when there is a difference equal to or larger than a predetermined threshold between the received image data and the printed image data of the received image data, send information about the difference and the read image to the transmission source terminal. Therefore, the sender of the image data can check the quality of the printed image by viewing the image printed on the sheet 303.

A fourth embodiment of the present invention is described below. In the fourth embodiment, the MFP 106 at the location B transmits binary image data to the MFP 103 at the location A, and the MFP 103 compares a character string that is recognized, through character recognition, from the received binary image data with a character string that is recognized, through character recognition, from image data read from a sheet on which the received image data is printed. If the MFP 103 determines that a difference between the character strings does not satisfy a predetermined condition, the MFP 103 notifies the MFP 106 of information indicating that the quality of the printed image is degraded.

Figure 17:
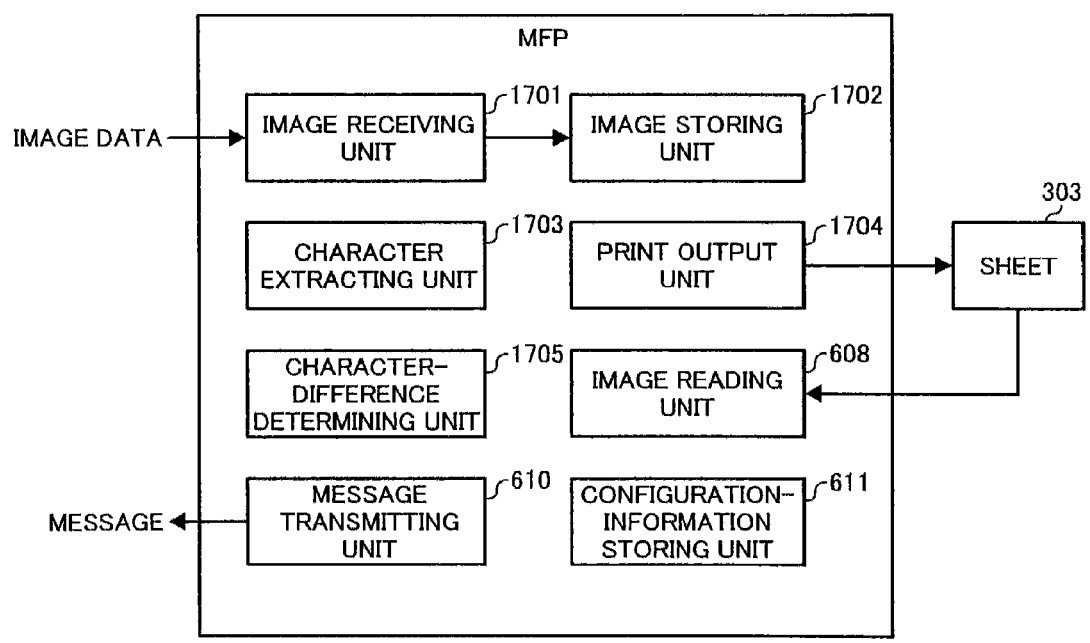
FIG. 17 is a block diagram of a functional configuration of an MFP according to a fourth embodiment of the present invention when the MFP functions as a receiving apparatus.

FIG. 17 illustrates a functional configuration of the MFP 103 when the MFP 103 functions as a receiving apparatus. The MFP 103 includes an image receiving unit 1701, an image storing unit 1702, a character extracting unit 1703, a print output unit 1704, a character-difference determining unit 1705, the image reading unit 608, the message transmitting unit 610, and the configuration-information storing unit 611.

The image receiving unit 1701 receives modified modified read (MMR)-compressed binary image data from other IP-FAX by implementing the IP-FAX protocol defined by ITU-T recommendation T.38. The image storing unit 1702 stores the binary image data received by the image receiving unit 1701 in the hard disk 214.

The character extracting unit 1703 extracts a character from the binary image data based on an algorithm, which will be described later. The print output unit 1704 prints the binary image data on the sheet 303 by using the print engine 211. The character-difference determining unit 1705 compares the character string extracted from the received binary image data by the character extracting unit 1703 with the character string extracted by the character extracting unit 1703 from the binary image data read from the sheet 303 by the image reading unit 608. The character-difference determining unit 1705 compares the number of different characters obtained as a result of comparison with the predetermined condition stored in advance in the flash ROM 202. The predetermined condition corresponds to the acceptable number of different characters.

The image reading unit 608 reads an image printed on the sheet 303 by using the sheet-discharge scanner 212, acquires RGB digital image data, and transforms the RGB image data into image data of color-different components (Cb and Cr) and a brightness component (Y). The image reading unit 608 sends binary image data obtained by binarizing the image data of the brightness component (Y) to the character extracting unit 1703.

The message transmitting unit 610 transmits a message to other apparatus by using the SIP instant message. The configuration-information storing unit 611 stores, in the flash ROM 202, information used as a difference condition for detecting a difference between the character string extracted from the received binary image data and the character string extracted from the binary image data read from the printed image.

When a sender sets either a monochrome original or a color original on the original scanner 208, inputs the FAX number of the MFP 103, and presses a start key, the image reading unit 501 controls the original scanner controller 209 to read an image of the original by using the original scanner 208, and acquires RGB digital image data. The read RGB image data is transformed into image data of color-difference components (Cb and Cr) and a brightness component (Y), and the image data of the brightness component (Y) is binarized and MMR encoded. The image transmitting unit 502 then transmits the MMR-encoded binary image data to the MFP 103 according to the communication procedure shown in FIG. 7

Figure 18:
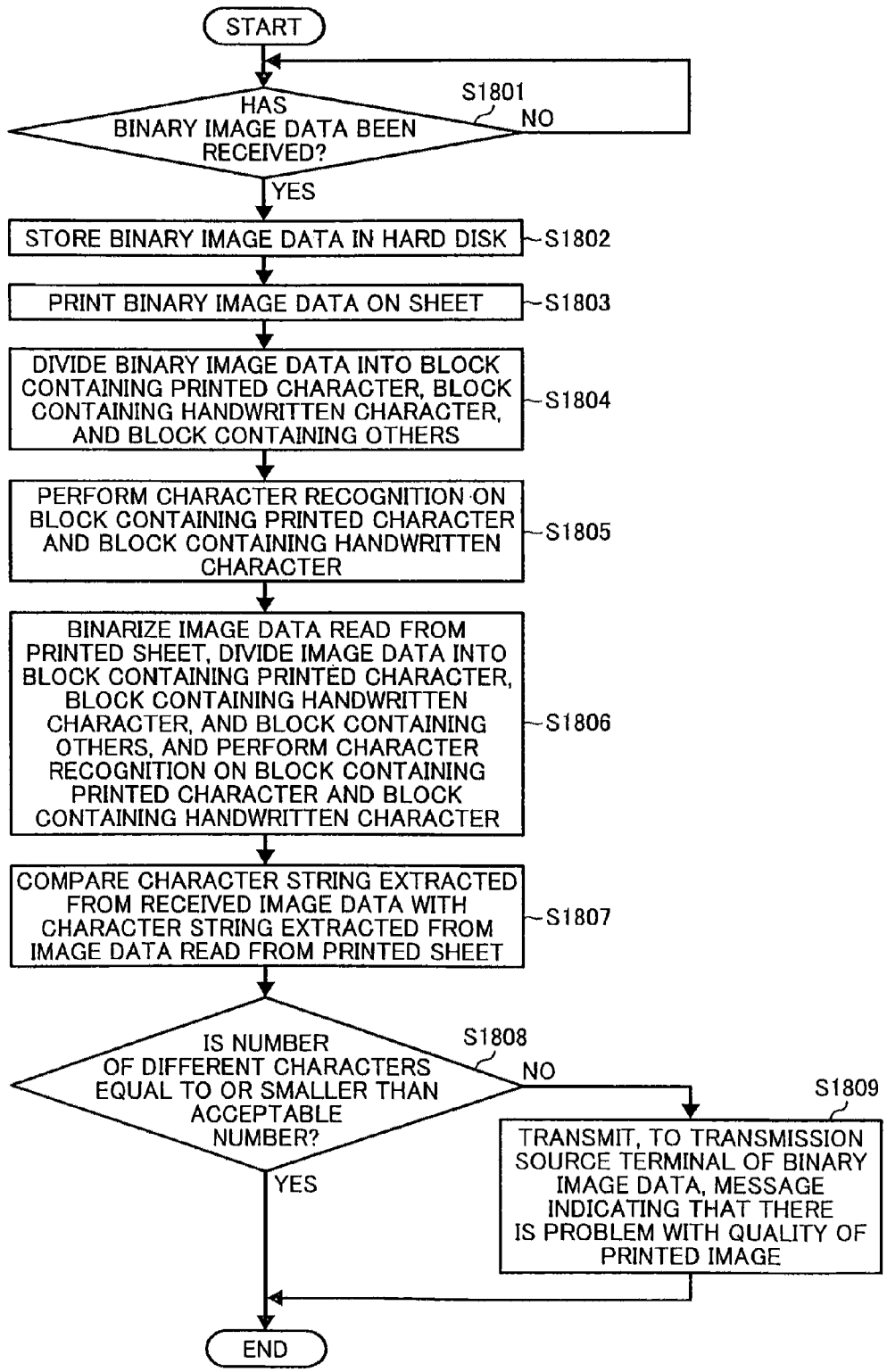
FIG. 18 is a flowchart of a process performed by one MFP for receiving binary image data transmitted from the other MFP according to the fourth embodiment.

A process for receiving, by the MFP 103, the binary image data transmitted from the MFP 106 is described in detail below with reference to a flowchart of FIG. 18.

The MFP 103 determines whether the image receiving unit 1701 has received the binary image data (MMR encoded data) transmitted from the MFP 106 (Step S1801). When the binary image data has been received, process control proceeds to Step S1802. On the other hand, when the binary image data has not been received, processing at Step S1801 is repeated.

The image storing unit 1702 stores the received binary image data in the hard disk 214 (Step S1802).

The print output unit 1704 performs MMR decoding processing on the binary image data (the MMR encoded data) stored in the hard disk 214, so that binary image data (raw image data) containing pixels of 0 and pixels of 1 is obtained. Then, the print output unit 1704 sends the raw image data to the character extracting unit 1703 and prints the raw image data on the sheet 303 by using the print engine 211 (Step S1803).

The character extracting unit 1703 extracts a character portion from the binary raw image data and performs processing for recognizing whether the extracted character is a printed character or a handwritten character. The processing is performed by using a method disclosed in, for example, Japanese Patent Application Laid-open No. 2006-92346. In other words, a tilt of the image is corrected, and the image is divided into a block containing a printed character, a block containing a handwritten character, and a block containing others (e.g., drawings) through a layout analysis (Step S1804).

Figure 19:
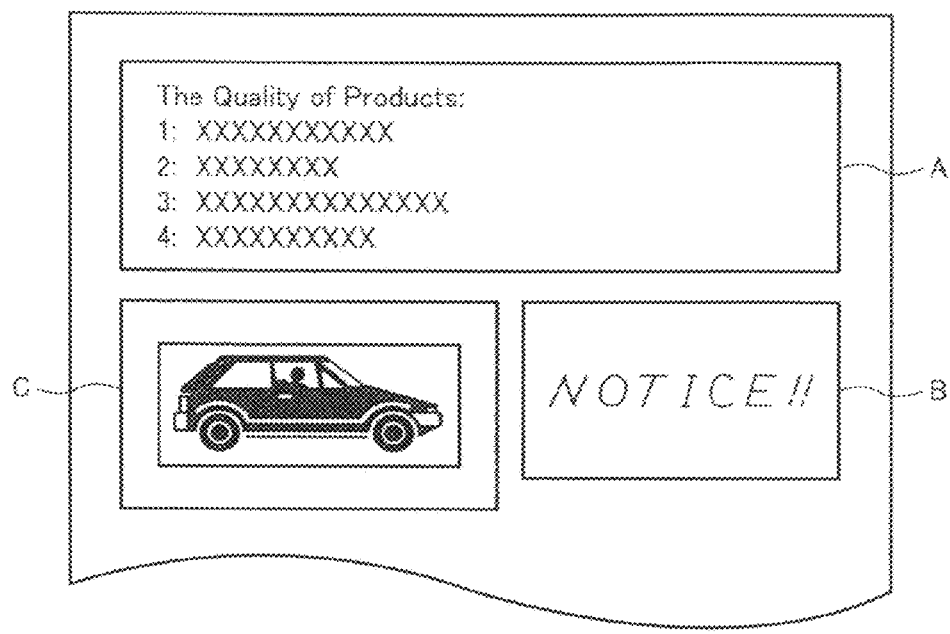
FIG. 19 is a schematic diagram of an example of a binary image divided into blocks through layout analysis according to the fourth embodiment.

An example of an image divided into blocks through the layout analysis by the character extracting unit 1703 is illustrated in FIG. 19. A block A is the block containing printed characters, a block B is the block containing handwritten characters, and a block C is the block containing others. Rows of "X" in the block A are illustrated as abstraction of characters. The character extracting unit 1703 recognizes the characters in the block A containing the printed characters based on peripheral zero-crossing code and canonical discriminant analysis (Step S1805).

The peripheral zero-crossing code is a technique for recognizing characters by performing pattern processing on a binary image as an entirely-defocused multivalued image and acquiring features of a boundary between a character and a background. The canonical discriminant analysis is a technique for identifying a character based on features of the character. For the canonical discriminant analysis, a table containing numeric values indicating the features of the character is generated so that similar characters can be easily distinguished from one another (see Pattern recognition and Media understanding, Technical report of The Institute of Electronics, Information and Communication Engineers (IE-ICE), PRMU 98 (490), page 71 to 78, 19981218). The table containing the numeric values indicating the features of the character is stored in, for example, the hard disk 214 in advance.

The character extracting unit 1703 recognizes a character based on a combination of contour analysis for acquiring a structure of a shape such as an edge portion, a convex portion, or a concave portion, the above-described peripheral zero-crossing code, and the above-described canonical discriminant analysis. The contour analysis is effective to recognize handwritten characters other than Chinese character, while the peripheral zero-crossing code and the canonical discriminant analysis are effective to recognize handwritten Chinese characters. The recognized character strings are classified into a character string in the block A and a character string in the block B, and they are stored in the main memory 203 separately.

When the printed sheet passes through the sheet discharge port, the image reading unit 608 reads the image printed on the sheet 303 by using the sheet-discharge scanner 212, acquires RGB image data, transforms the RGB image data into image data of color-difference components (Cb and Cr) and a brightness component (Y), and stores the image data of the brightness component (Y) in the main memory 203 for use by the character extracting unit 1703. Then, the character extracting unit 1703 compares the image data of the brightness component (Y) stored by the image reading unit 608 with a predetermined brightness value previously stored as a threshold level in the flash ROM 202, and transforms the image data into image data of a binary image. The character extracting unit 1703 then extracts the character portion from the binary image as described above, divides the binary image into blocks by recognizing whether the extracted character is printed characters or handwritten characters, and recognizes the characters in each block (Step S1806).

Figure 20:
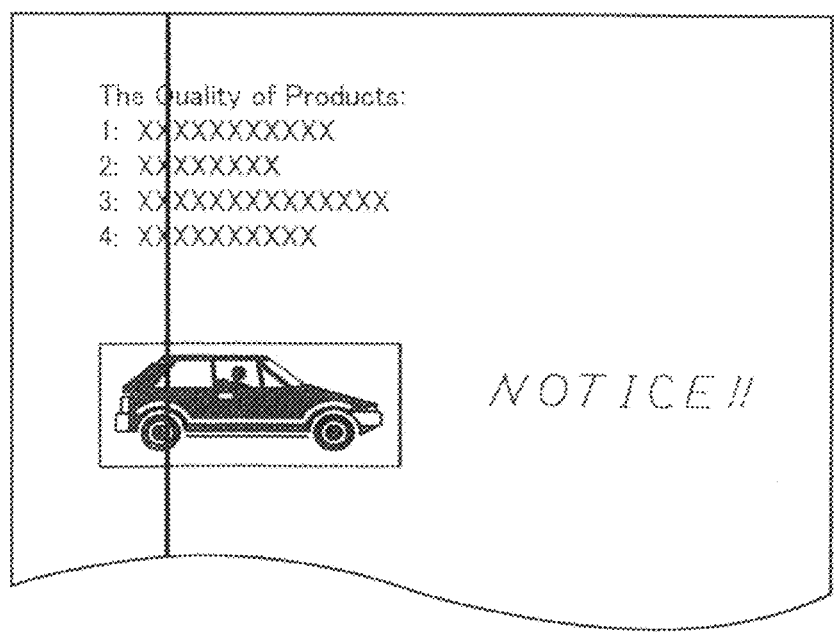
FIG. 20 is a schematic diagram of an example of an output binary image containing a defected portion according to the fourth embodiment.

An example in which there is a defect in a printed image is described below. For example, when there is a problem with the print engine 211 and if a straight line is printed in an image as shown in FIG. 20, the character extracting unit 1703 recognizes characters on the first row in the block A as "The Quality of Products:" while actual characters in the image are "The Quality of Products:".

Then, the character-difference determining unit 1705 compares a character string that is extracted from the received binary image data with a character string that is extracted from the binary image data read by the image reading unit 608 from the sheet 303 with respect to each of the block A and the block B (Step S1807). Different characters between the examples shown in FIGS. 19 and 20 as a result of the comparison are enclosed in a rectangle in FIG. 21. In this case five different characters are detected between the examples shown in FIGS. 19 and 20. As for the block B, no different characters are detected.

The character-difference determining unit 1705 determines whether the number of the different characters is equal to or smaller than the acceptable number stored in advance in the flash ROM 202 (Step S1808). When the number of the different characters is equal to or smaller than the acceptable number, process control ends. On the other hand, when the number of the different characters is larger than the acceptable number, process control proceeds to Step S1809.

For example, if the acceptable number is set to three, the number of the different characters in FIG. 21 is larger than the acceptable number, the message transmitting unit 610 transmits a message indicating that there is a problem with the quality of the image printed on the sheet 303 to the MFP 106 as the transmission source terminal (Step S1809). At this time, the message transmitting unit 610 transmits the message to the MFP 106 by using the SIP instant message.

In the above example, the acceptable number of different characters is stored in advance in the flash ROM 202 as a character-difference determination condition. However, it is possible to store a percentage of the different characters to the total number of the recognized characters in the flash ROM 202 in advance so that the acceptable number of the different characters can be calculated based on the percentage.

Furthermore, in the above description, the example is used in which the acceptable different characters are discretely distributed in a lateral direction. However, it is possible to use the number of consecutive different characters as the character-difference determination condition to cope with a case where different characters are consecutively present in the lateral direction. In other words, when the number of consecutive different characters exceeds the acceptable number, the message transmitting unit 610 transmits a message indicating that there is a problem with the quality of the image printed on the sheet 303 to the MFP 106 as the transmission source terminal.

In the processing at Step S1807, it is possible to consider a plurality of similar characters as identical characters. In this case, for example, the character extracting unit 1703 is configured to store information contained in a table shown in FIG. 22. The table shown in FIG. 22 contains correspondence between characters and similar characters classified into the first class, the second class, and the third class according to the similarity. For example, regarding an alphabet "C", examples of characters at the similarity "1" (in the first class) include "G", "O", and "0", examples of characters at the similarity "2" (in the second class) include "D" and "Q", and examples of characters at the similarity "3" (in the third class) include "6".

The character extracting unit 1703 refers to the table shown in FIG. 22 depending on the acceptable number of similar characters stored in advance in the flash ROM 202, and compares the character strings with each other assuming that the accepted similar characters are identical characters.

The MFP according to the fourth embodiment can include either one of the e-mail transmitting unit 1101 described in the second embodiment or the image transmitting unit 502 described in the third embodiment or both. In this case, the e-mail transmitting unit 1101 transmits the same message when the message transmitting unit 610 transmits the message. This processing is the same as that performed at Step S1416 in the second embodiment. The image transmitting unit 502 transmits the read image when the message transmitting unit 610 transmits the message. This process is the same as that performed at Step S1616 in the third embodiment.

In the above description, it is explained that the sheet-discharge scanner 212 reads the image printed on the sheet 303. However, it is possible to cause the original scanner 208 to read the sheet 303 with the image after the sheet 303 is discharged. With this configuration, the present invention can be implemented without mounting the sheet-discharge scanner 212 at the sheet discharge port.

The image communication apparatus according to the embodiments can be implemented by a PC and the like. The image communication method according to the embodiments can be realized by causing a CPU to execute a computer program stored in a ROM or a hard disk drive by using a main memory such as a RAM as a work area.

Each of the units described above can be implemented by a computer-executable program written in a legacy programming language such as assembler, C, C++, C#, and Java (registered trademark) or an object-oriented programming language. The computer-executable program can be stored in a computer-readable recording medium such as a ROM, an EEPROM, an EPROM, a flash memory, a flexible disk, a CD-ROM, a CD-RW, a DVD, an SD card, and a MO disk, for distribution.

The present invention is not limited to the embodiments described above. Various modification can be made without departing from the scope of the present invention and their equivalents.

According to one aspect of the present invention, a sender who has transmitted image data can check the quality of an image of the image data printed by a receiving apparatus. Therefore, reliability of an image communication apparatus can be enhanced.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image communications apparatus comprising:
an image-data receiving unit that receives image data from other image communication apparatus;
a storing unit that stores therein the image data;
an output unit that outputs the image data stored in the storing unit;
a reading unit that reads the image data output by the output unit;
a character-string extracting unit that extracts a first character string from the image data read by the reading unit and a second character string from the image data stored in the storing unit;
a difference extracting unit that extracts a difference between the first character string fro the image data read by the reading unit and the second character string from the image data stored in the storing unit;
a difference determining unit that determines whether the difference extracted by the difference extracting unit satisfies a predetermined condition; and
a control unit that controls a transmission of a message to the other image communication apparatus indicating that the image data output by the output unit is different from the image data received by the receiving unit, if a result of determination by the difference determining unit does not satisfy the predetermined condition.

2. The image communication apparatus according to claim 1, further comprising an e-mail-address acquiring unit that acquired an e-mail address of a sender of the image data, wherein
the control unit transmits the message via an e-mail to the e-mail address acquired by the e-mail address acquiring unit.

3. The image communication apparatus according to claim 2, wherein the control unit attaches the image data read by the reading unit to the e-mail.

4. The image communication apparatus according to claim 1, wherein the difference between the image data read by the reading unit and the image data stored in the storing unit is a difference in color.

5. The image communication apparatus according to claim 1, wherein the difference between the image data read by the reading unit and the image data stored in the storing unit is a difference in colors.

6. The image communication apparatus according to claim 5, further comprising:
a character extracting unit that extracts a first character from the image data read by the reading unit and a second character from the image data stored in the storing unit;
a character determining unit that determines whether the first character and the second character are identical to each other; and
an image-area extracting unit that extracts, when the character determining unit determines that the first character and the second character are identical to each other, a first image area containing the first character and a second image area containing the second character, wherein
the difference between the image data read by the reading unit and the image data stored in the storing unit is a difference between the image data in the first image area and the image data in the second image area.

7. The image communication apparatus according to claim 6, wherein the difference between the image data read by the reading unit and the image data stored in the storing unit is a difference between a pixel color of the first character and a pixel color of the second character.

8. The image communication apparatus according to claim 5, wherein when the difference determining unit determines that the difference satisfies the predetermined condition, the control unit deletes the image data stored in the storing unit.

9. The image communication apparatus according to claim 1, further comprising:
a character extracting unit that extracts a first character from the image data read by the reading unit and a second character from the image data stored in the storing unit;
a character determining unit that determines whether the first character and the second character are identical to each other; and
an image-area extracting unit that extracts, when the character determining unit determines that the first character and the second character are identical to each other, a first image area containing the first character and a second image area containing the second character, wherein
the difference between the image data read by the reading unit and the image data stored in the storing unit is a difference between the image data in the first image area and the image data in the second image area.

10. The image communication apparatus according to claim 9, wherein the difference between the image data read by the reading unit and the image data stored in the storing unit is a difference between a pixel color of the first character and a pixel color of the second character.

11. The image communication apparatus according to claim 1, wherein when the difference determining unit determines that the difference satisfies the predetermined condition, the control unit deletes the image data stored in the storing unit.

12. The image communication apparatus according to claim 1, wherein the predetermined condition includes a condition on a number of different characters between the first character string and the second character string.

13. The image communications apparatus according to claim 1, wherein the predetermined condition includes a condition on a number of different characters running between the first character string and the second character string.

14. The image communication apparatus according to claim 1, wherein the difference determining unit determines a plurality of similar characters as identical characters.

15. A method of communicating image data between a first image communication apparatus and a second image communication apparatus, the method comprising:
- transmitting including the first image communication apparatus transmitting image data to the second image communication apparatus;
- receiving including the second image communication apparatus receiving the image data from the first image communication apparatus;
- storing including the second image communication apparatus storing the image data received at the receiving;
- outputting including the second image communication apparatus outputting the image data stored at the storing;
- reading including the second image communication apparatus reading the image data output at the outputting;
- extracting including the second image communication apparatus extracting a character difference between a first character string contained within the image data read at the reading and a second character string contained within the image data stored at the storing;
- determining including the second image communication apparatus determining whether the character difference extracted at the extracting satisfies a predetermined condition; and
- controlling including the second image communication apparatus controlling, when it is determined that the character difference does not satisfy the predetermined condition at the determining, a transmission of a message indicating that the image data output at the outputting is different from the image data received at the receiving to the first image communication apparatus.

16. A computer program product comprising a non-transitory computer usable medium having computer readable program codes embodied in the medium for implementing a method of communicating image data between a first image communication apparatus and a second image communication apparatus, the program codes when executed causing a computer to execute:
- transmitting including the first image communication apparatus transmitting image data to the second image communication apparatus;
- receiving including the second image communication apparatus receiving the image data from the first image communication apparatus;
- storing including the second image communication apparatus storing the image data received at the receiving;
- outputting including the second image communication apparatus outputting the image data stored at the storing;
- reading including the second image communication apparatus reading the image data output at the outputting;
- extracting including the second image communication apparatus extracting a character difference between a first character string contained within the image data read at the reading and a second character string contained within the image data stored at the storing;
- determining including the second image communication apparatus determining whether the character difference extracted at the extracting satisfies a predetermined condition; and
- controlling including the second image communication apparatus controlling, when it is determined that the character difference does not satisfy the predetermined condition at the determining, a transmission of a message indicating that the image data output at the outputting is different from the image data received at the receiving to the first image communication apparatus.

17. An image communication apparatus comprising
an image-data receiving unit that receives image data from other image communication apparatus;
a storing unit that stores therein the image data; an output unit that outputs the image data stored in the storing unit;
a reading unit that reads the image data output by the output unit;
a difference extracting unit that extracts a difference between the image data read by the reading unit and the image data stored in the storing unit;
a difference determining unit that determines whether the difference extracted by the difference extracting unit satisfied a predetermined condition;
an e-mail-address acquiring unit that acquires an e-mail address of a sender of the image data; and
a control unit that controls a transmission of a message to the other image communication apparatus via an e-mail to the e-mail address acquired by the e-mail-address acquiring unit, the message indicating that the image data output by the output unit is different from the image data received by the receiving unit, if a result of determination shows that the difference does not satisfy the predetermined condition.

* * * * *